United States Patent [19]

Dennis et al.

[11] 4,435,800
[45] Mar. 6, 1984

[54] AUTOMATIC RECORD PLAYER

[75] Inventors: James T. Dennis, P.O. Box 15100, Oklahoma City, Okla. 73155; George Kolomayets, Chicago, Ill.

[73] Assignee: James T. Dennis, Oklahoma City, Okla.

[21] Appl. No.: 377,150

[22] Filed: May 12, 1982

Related U.S. Application Data

[60] Division of Ser. No. 211,837, Dec. 1, 1980, Pat. No. 4,352,177, Division of Ser. No. 9,254, Feb. 5, 1979, Pat. No. 4,291,886, which is a continuation of Ser. No. 813,225, Jul. 5, 1977, abandoned.

[51] Int. Cl.³ .............................................. G11B 17/08
[52] U.S. Cl. .................................... 369/225; 369/244; 369/257; 369/292
[58] Field of Search ................ 369/244, 257, 292, 225

[56] References Cited

U.S. PATENT DOCUMENTS 3,218,078 11/1965 Freier ................................. 369/226
3,271,035 9/1966 Johnston ............................ 369/257
4,291,886 9/1981 Dennis et al. ...................... 369/203

Primary Examiner—Steven L. Stephan
Attorney, Agent, or Firm—Mason, Kolehmainen, Rathburn & Wyss

[57] ABSTRACT

A tone arm moving mechanism is provided wherein the tone arm is normally moved over the lead in groove and lowered to the record during the last half of a normal record changing cycle. Means are then provided which are operative during a last record shut-off cycle for lowering the tone arm into a retaining means on the rest post, said retaining means being effective to restrain the tone arm from inward movement during the remaining portion of the last record shut-off cycle.

11 Claims, 37 Drawing Figures

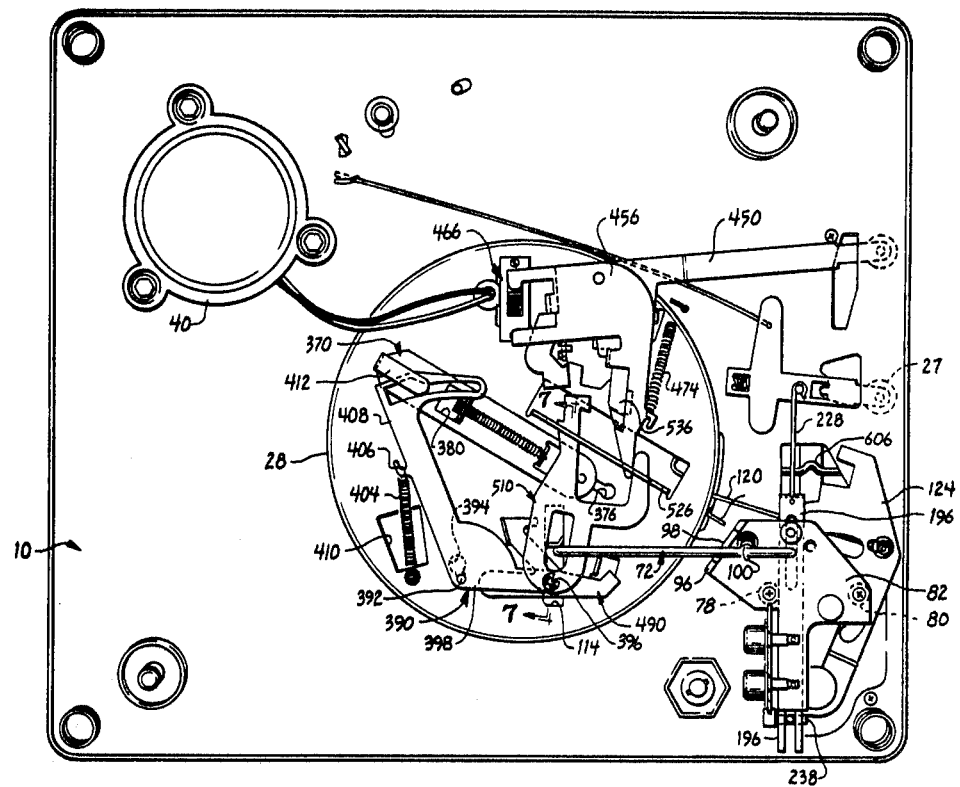
Fig 2
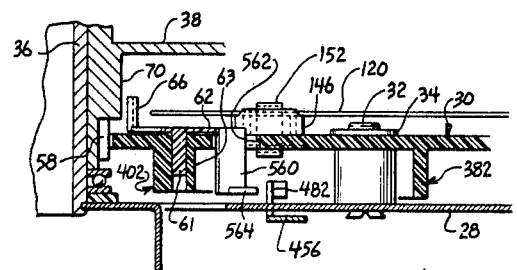
Fig 10
Fig 11
Fig 12

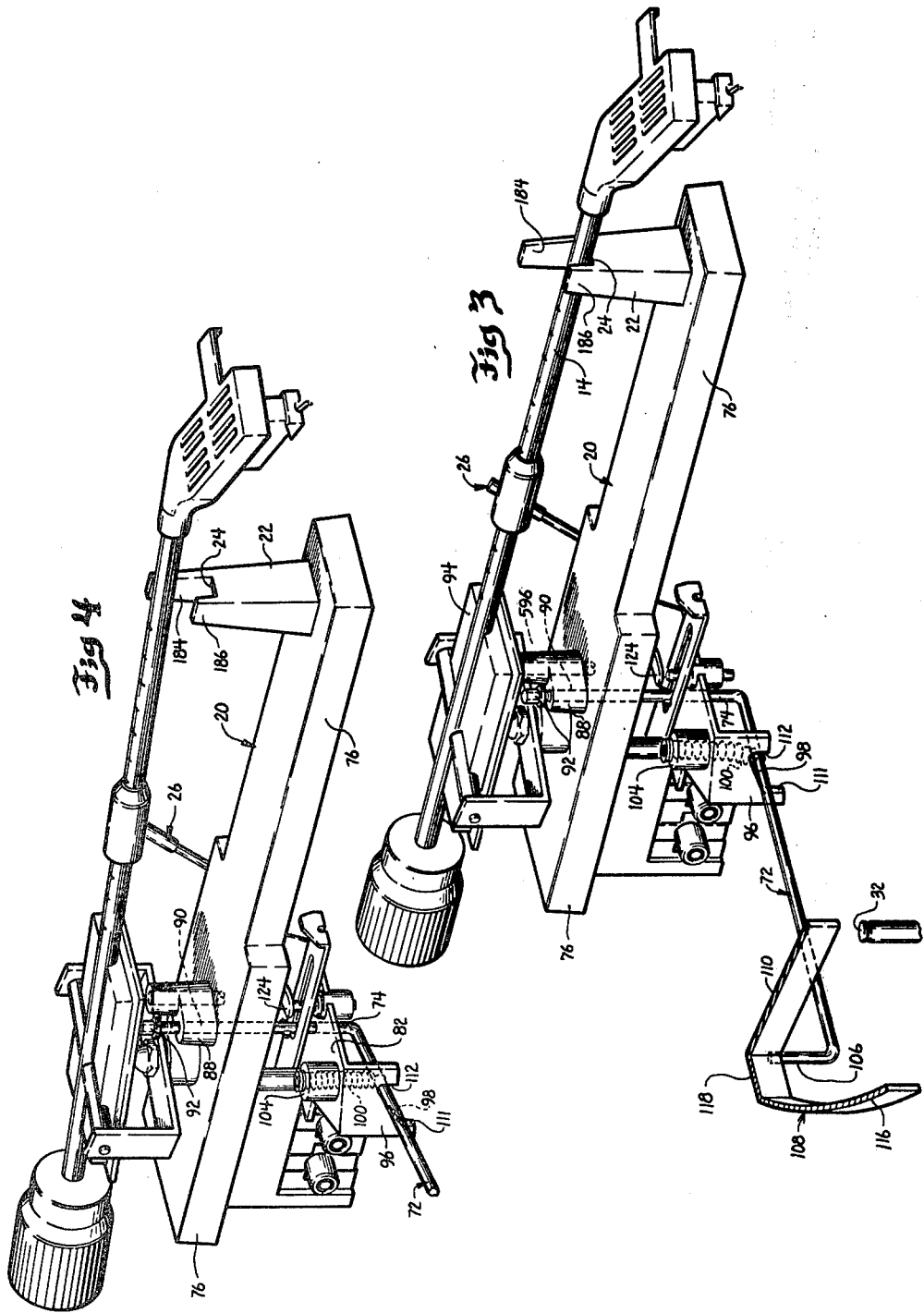

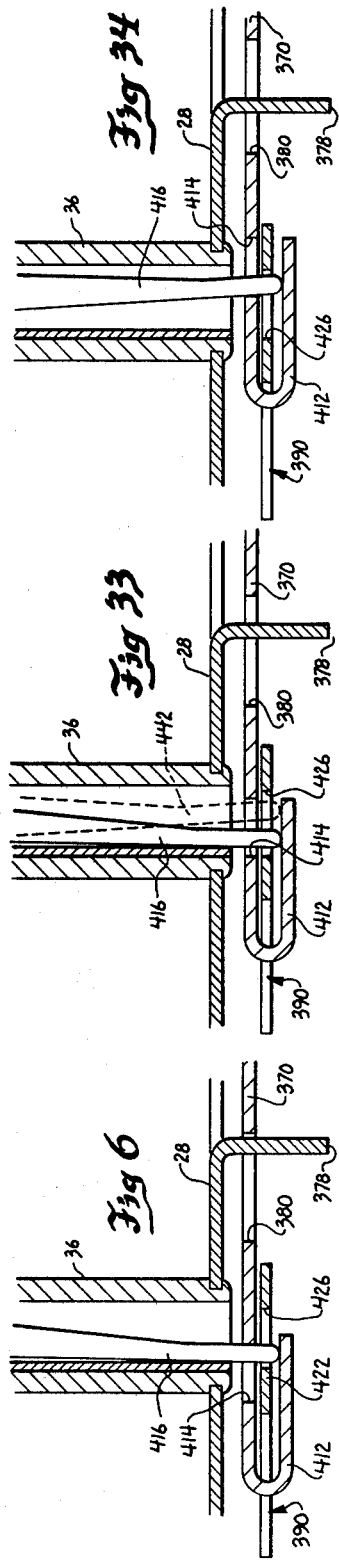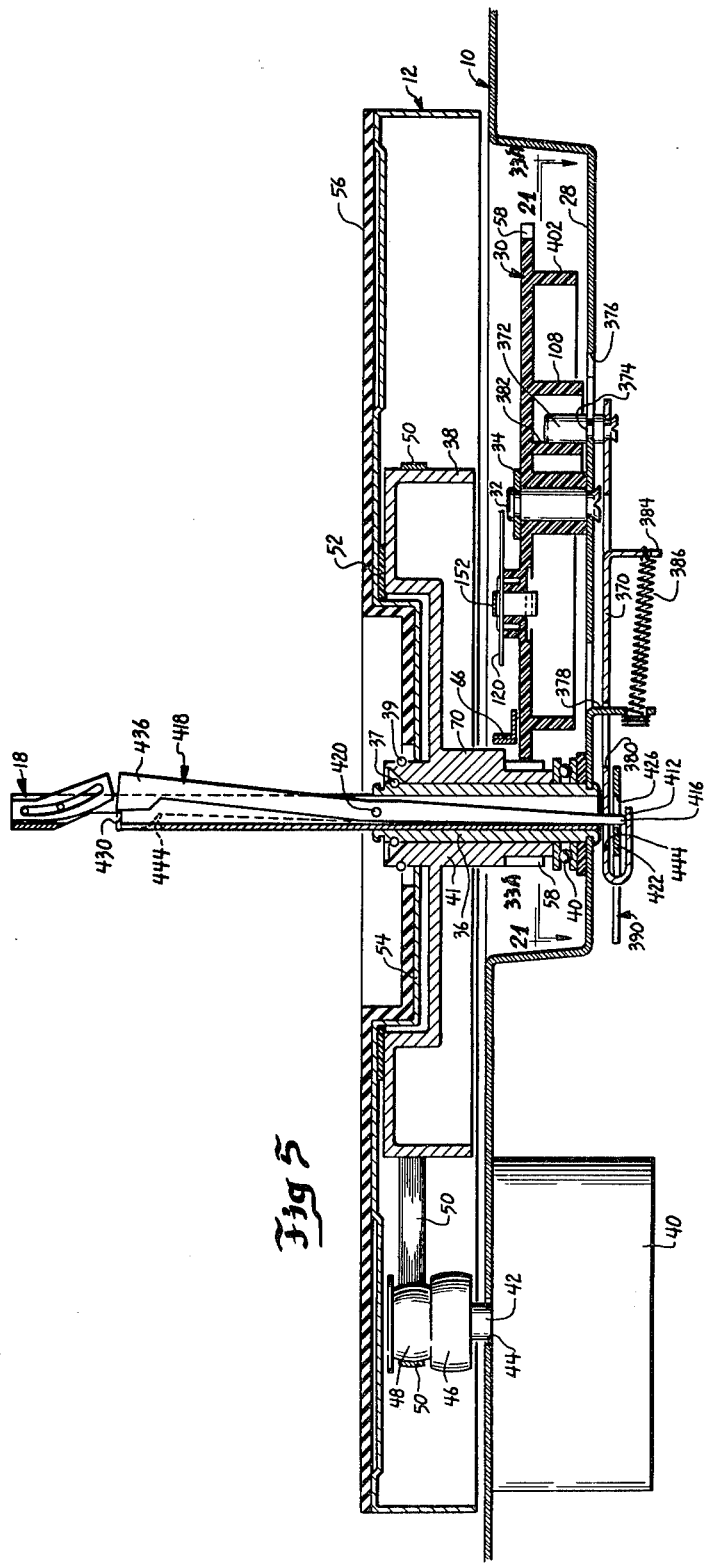

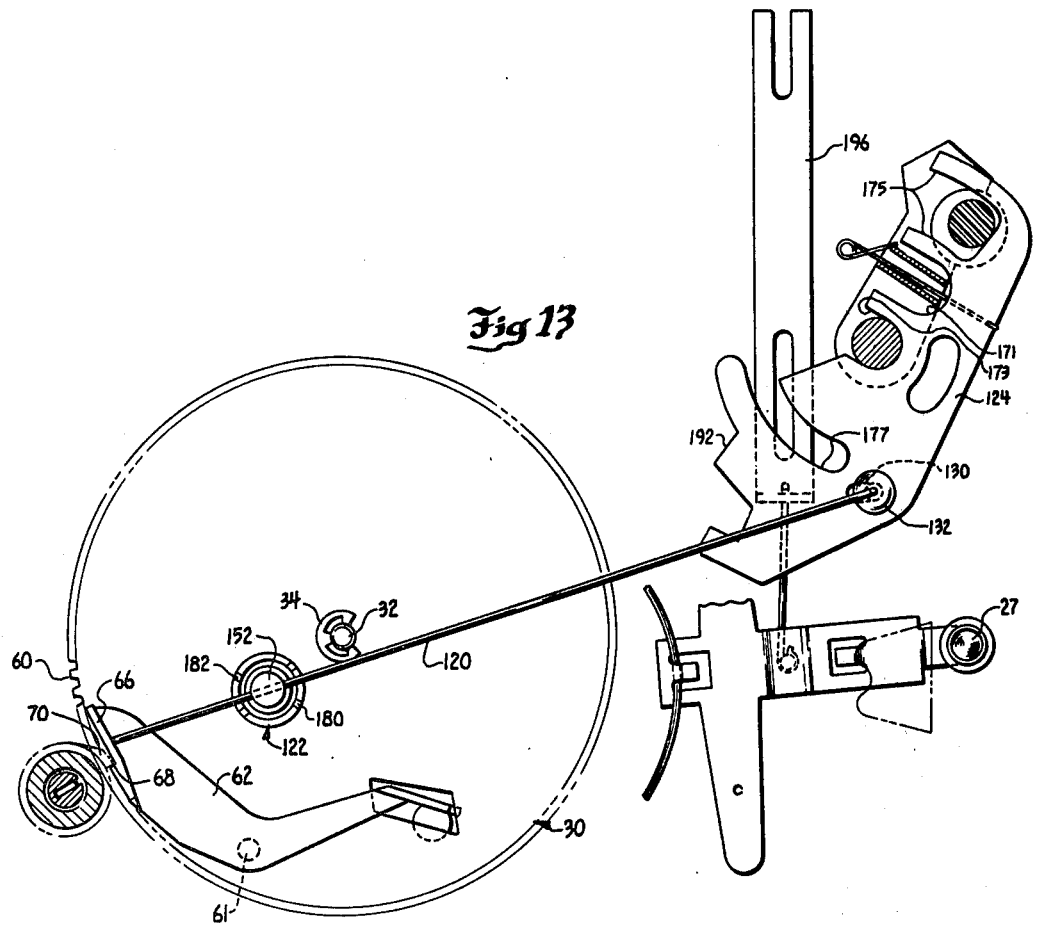
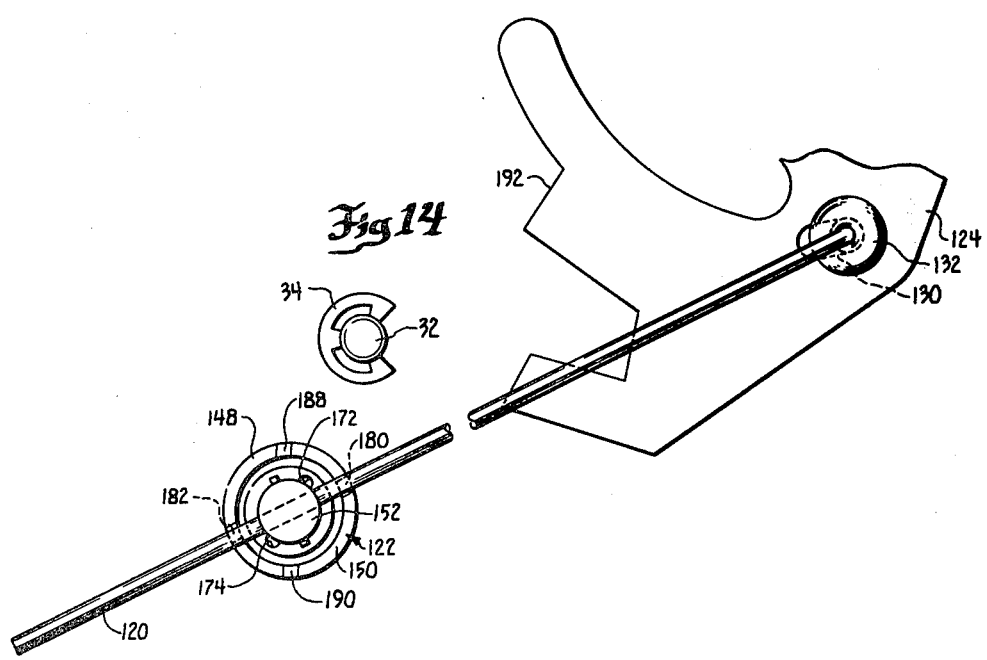

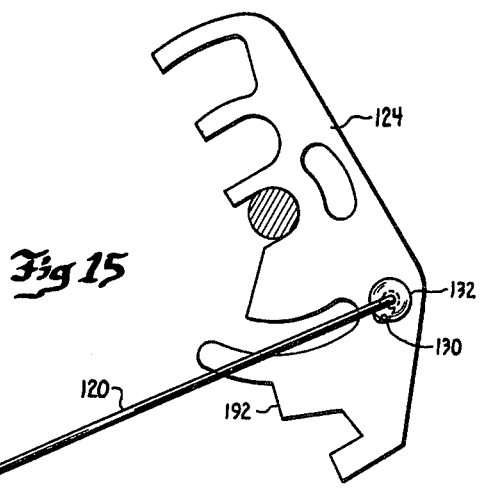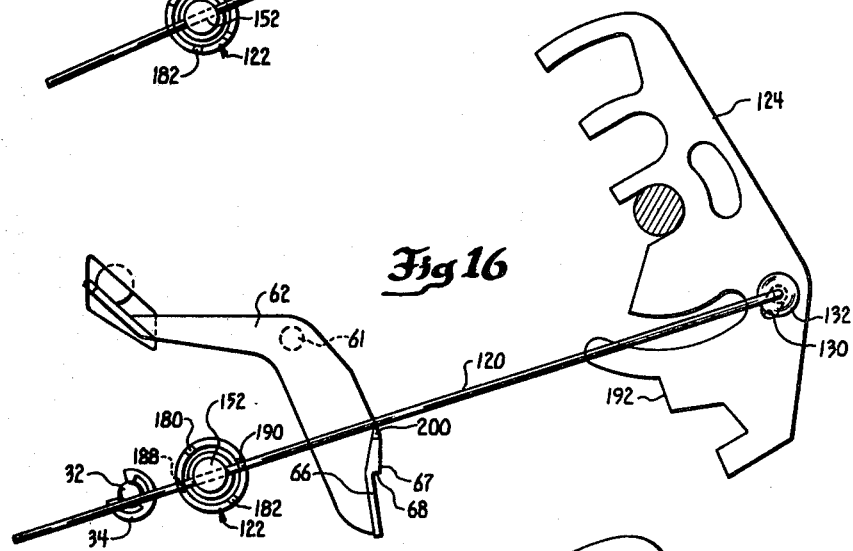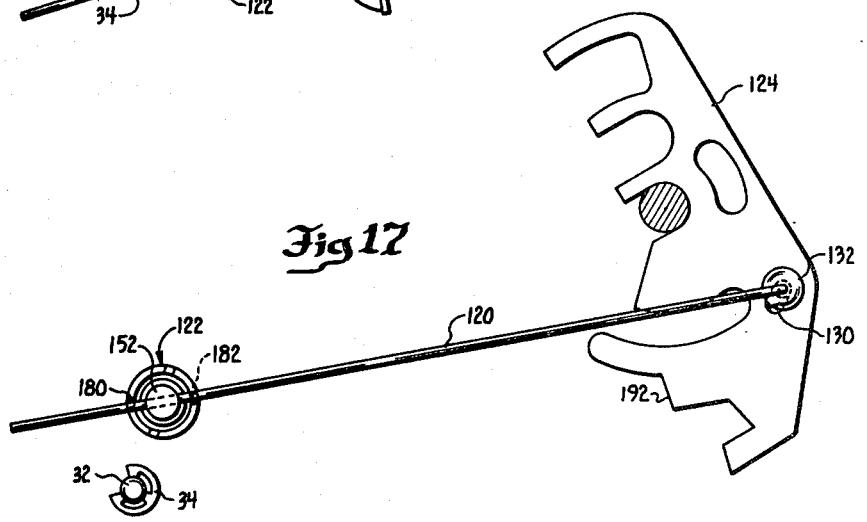

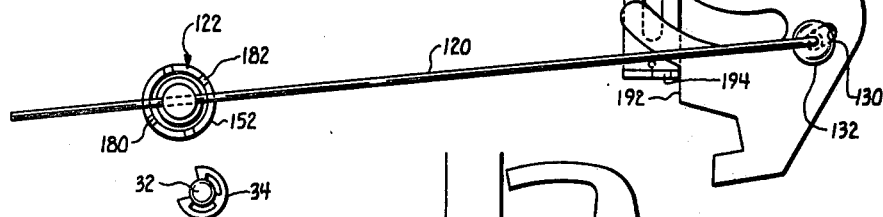
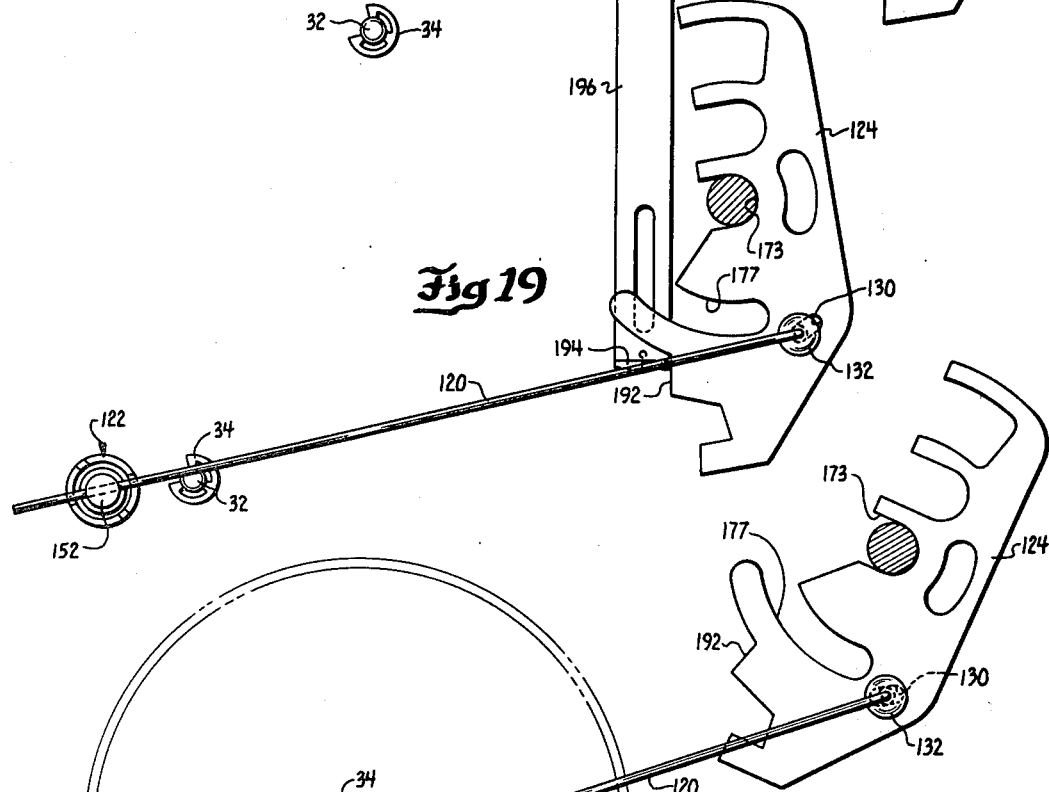
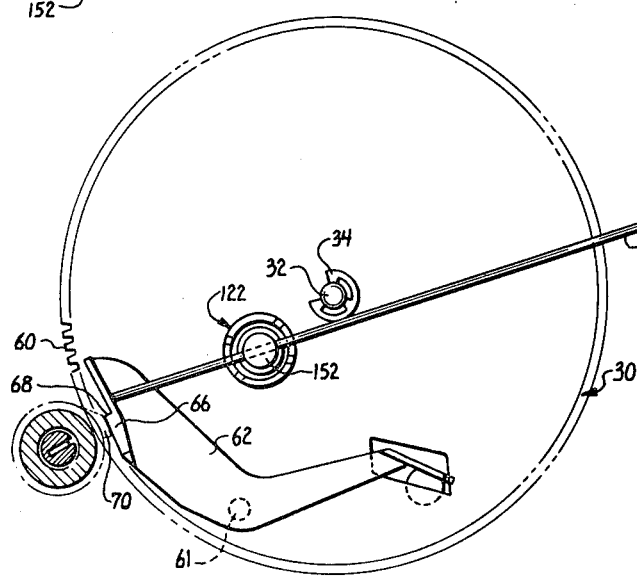

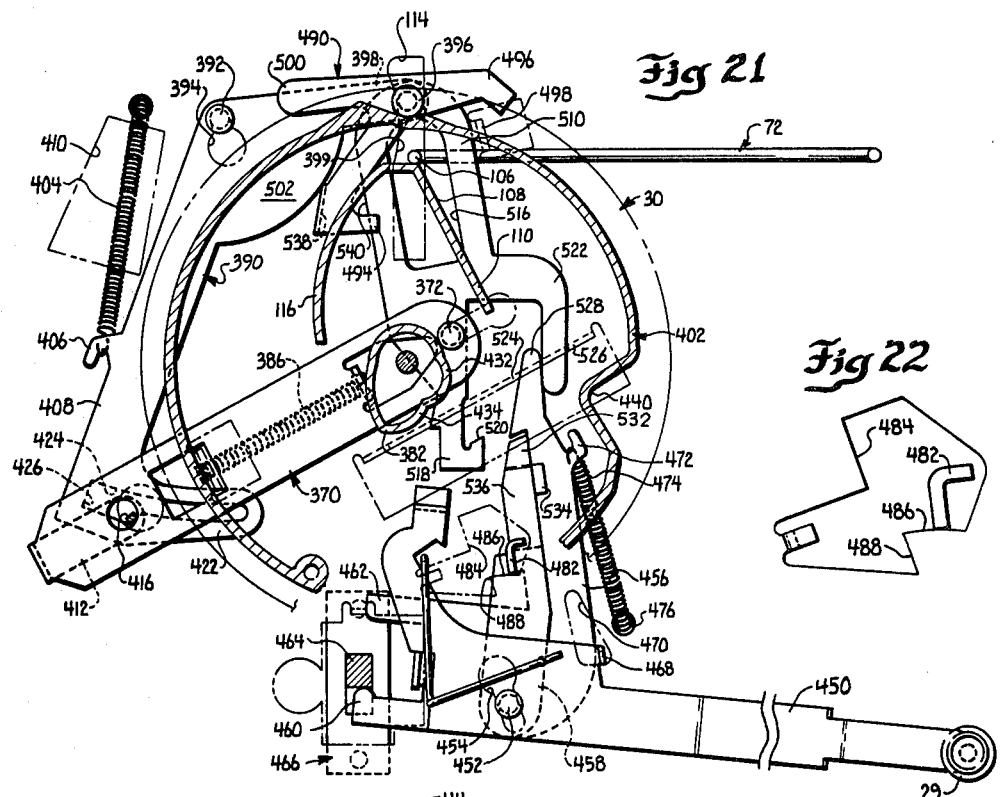

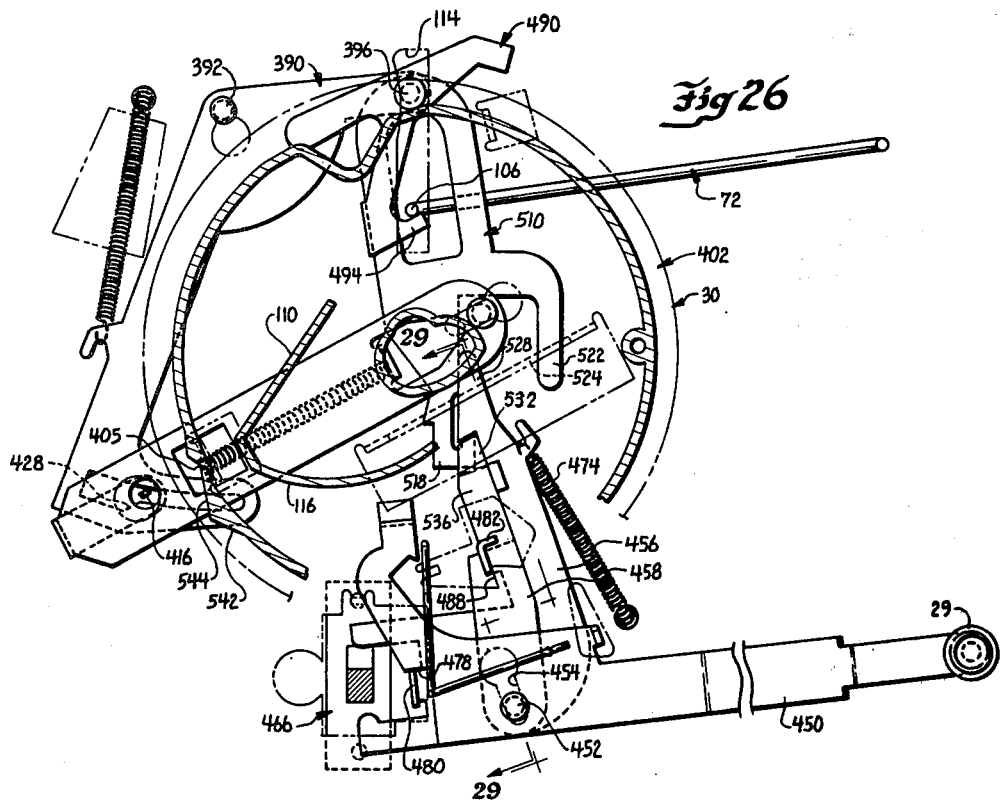
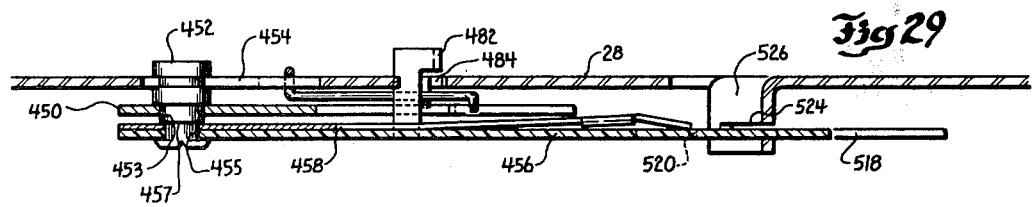
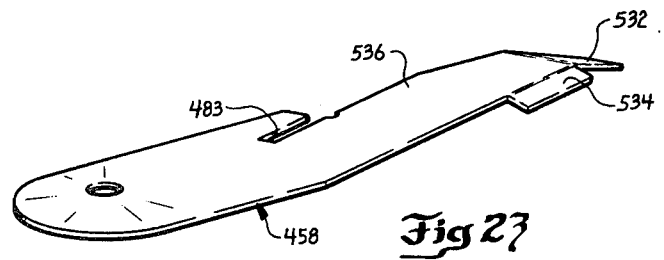

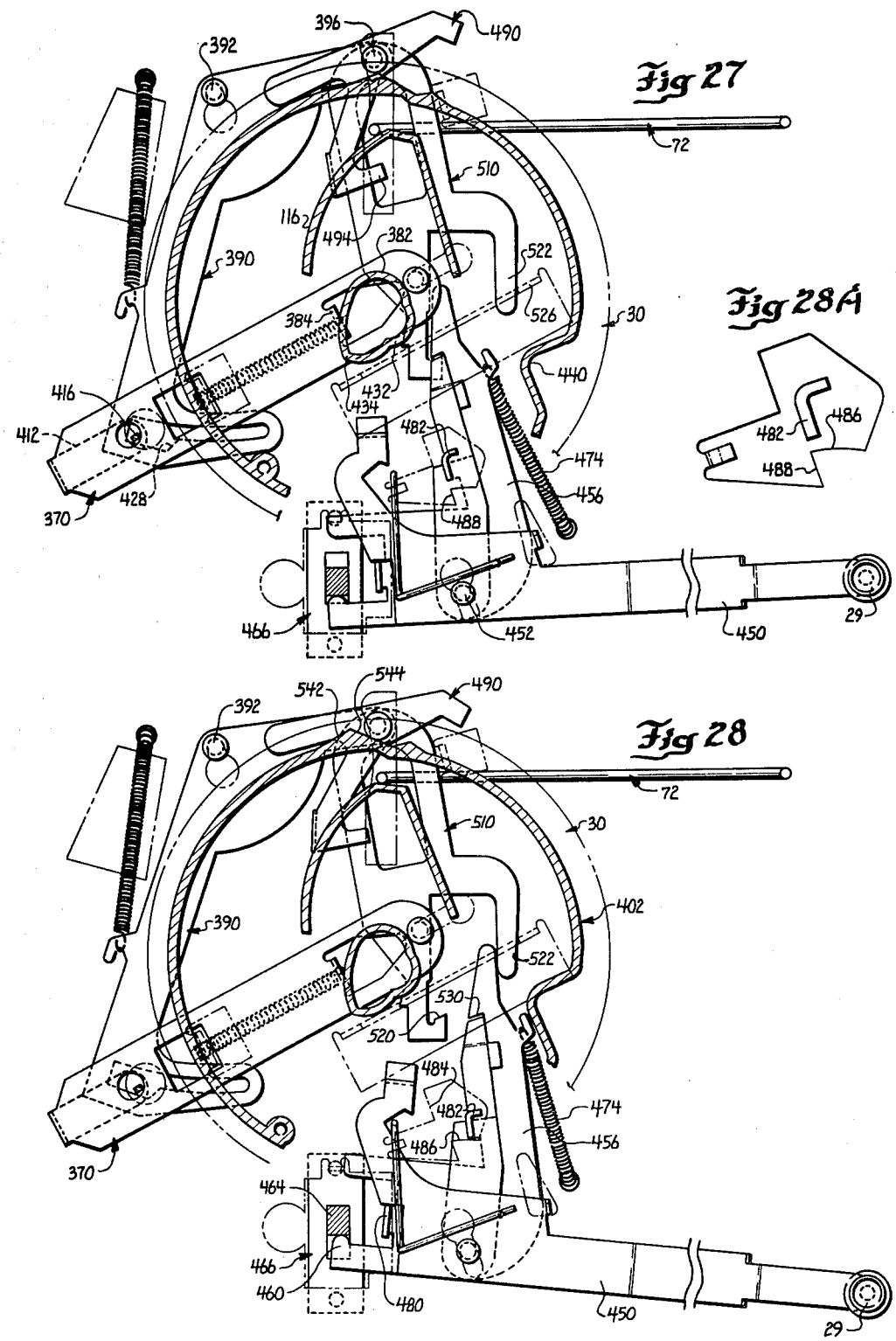

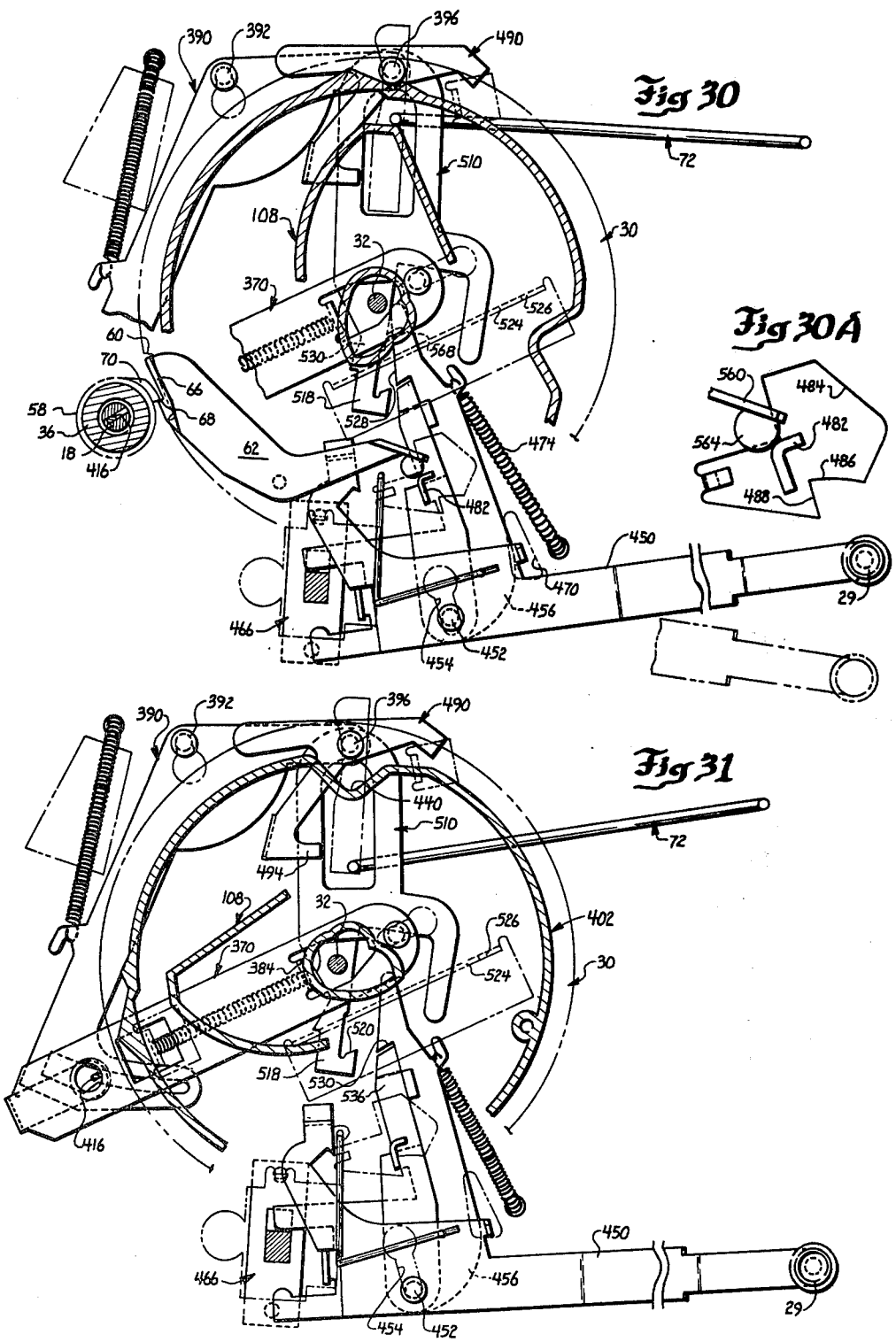

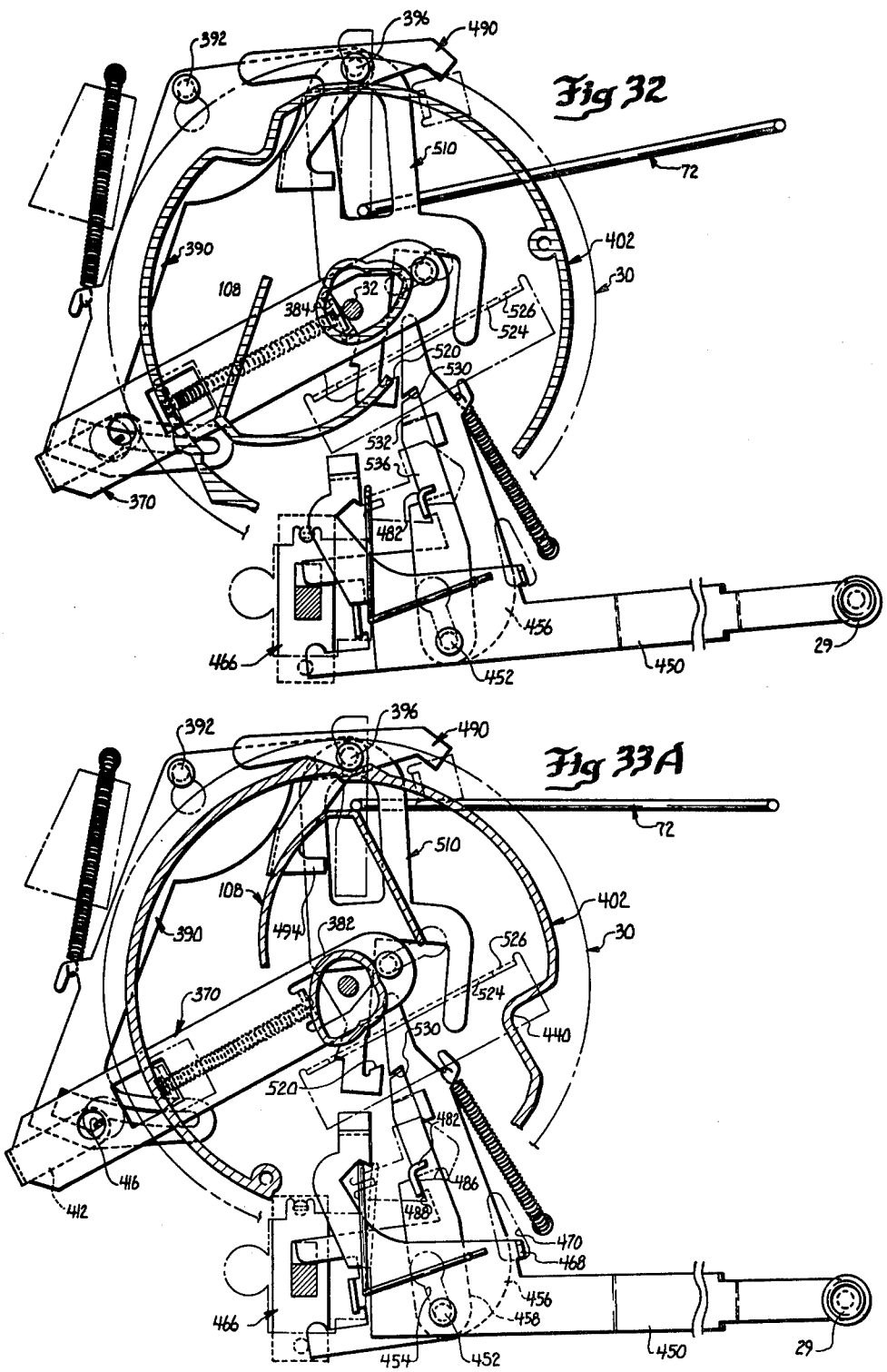

AUTOMATIC RECORD PLAYER

The present invention is a division of our copending application Ser. No. 211,837 filed Dec. 1, 1980, now U.S. Pat. No. 4,352,177, which is itself a division of our application Ser. No. 009,254 filed Feb. 5, 1979, which issued Sept. 29, 1981 as U.S. Pat. No. 4,291,886 which is itself a continuation of parent application Ser. No. 813,225 filed July 5, 1977, now abandoned.

The present invention relates to record changers, and more particularly, to automatic record changers which are arranged to play a series of phonograph records in the order in which the records are placed on the centering spindle of the record changer.

Present day automatic record changers are much too complicated and expensive to manufacture. For example, the changer manufactured by BSR Ltd., which changer constitutes approximately eighty percent of the total world's production of automatic record changers, has approximately 220 parts and requires a substantial amount of labor to assemble and test these parts in order to manufacture the complete record changer. In addition, most, if not all, present day automatic record changers are sensitive to warpage and bending of the metal base plate on which the parts of the record changer are assembled. This base plate is conventionally made of relatively thin sheet metal and the tone arm driving and positioning mechanisms become misaligned and malfunction when warpage or bending of the base plate occurs, either in production, during shipping, or after the changer has been used by the customer. Furthermore, because the functions at the center of the turntable are interconnected with the functions at the tone arm mechanism by means of complicated linkages, and the like, it is not possible to separately test and align the tone arm assembly before it is assembled in the main base plate. Accordingly, the manufacturing cost of such arrangements is substantially increased. Also, in order to properly position the tone arm over the rest post of the changer, most conventional changers require indexing means associated with the tone arm quadrant for stopping the tone arm over the rest post and lowering it onto the rest post during the last record shutoff cycle. However, such arrangements are also sensitive to warpage and bending of the base plate which tends to misalign the portion of the base plate containing the rest post with respect to the area at which the tone arm is rotatably mounted.

With regard to the velocity tripping arrangements employed in many conventional changers, these velocity tripping arrangements usually employ two or more parts which are frictionally interconnected and can become randomly oriented by shock or vibration as the main gear is detented. In order to prevent this action it is customary to employ a relatively heavy friction force between the plates to prevent such misalignment. However, when such heavy friction is employed it is difficult to trip the changer with lightweight tone arm pressure in the order of one gram.

In Dennis U.S. Pat. No. 3,254,896 an arrangement is disclosed for stopping the turntable during the record changing cycles so that records are deposited on a stationary turntable. While this arrangement is generally suitable for its intended purpose, it is necessary with the arrangement disclosed therein to move the idler drive wheel out of engagement with the turntable rim before the turntable is stopped. In Dennis U.S. Pat. No. 3,408,081 a two turntable arrangement is employed wherein both turntables are lowered during the record changing cycle until the upper turntable engages stationary snubbing blocks and hence becomes disconnected from the lower driving turntable. While these arrangements for stopping the turntable are generally satisfactory for their intended purpose, it would be desirable to provide a somewhat simpler arrangement for stopping the turntable which could be readily incorporated into a particular automatic record changer if such a turntable pause feature is used.

It is, therefore, a primary object of the present invention to provide a new and improved automatic record changer wherein one or more of the above discussed disadvantages of prior art arrangements is avoided.

It is another object of the present invention to provide a new and improved automatic record changer wherein the tone arm is positioned during a last record shutoff cycle by physical engagement with a portion of the rest post, this engagement functioning accurately to register the tone arm for subsequently lowering into engagement with the rest post.

It is a still further object of the present invention to provide a new and improved automatic record changer wherein the tone arm is positioned over the rest post and lowered into retained engagement therewith somewhat before mid cycle of a last record shutoff cycle, the tone arm driving mechanism having a slip clutch arrangement to permit such retained engagement at mid cycle.

Briefly, in accordance with the present invention an extremely simple record changer mechanism is provided wherein only two members interconnect the tone arm subassembly with the main cycling gear in the spindle area of the changer. One of these members is employed to lift and lower the tone arm and the other member is used for the dual purpose of moving the tone arm horizontally during the record changing cycle and also acts as a velocity trip actuating member during the playing cycle. Both members are designed to avoid damage to the mechanism if the tone arm is accidentally moved or restrained during the record changing cycle. The presence or absence of a record on the spindle shelf is sensed by blade means which is moved in the direction of the shelf during the initial portion of the record changing cycle. If no record is present on the shelf, somewhat before mid cycle the tone arm is lowered into engagement with a retaining notch on the rest post and the turntable motor is turned off at the end of this last record shutoff cycle.

A turntable pause feature is provided by simply applying a braking force to the rim of the turntable while the turntable hub continues to be driven, a simple washer of low coefficient of friction material between the turntable and its hub permitting the turntable to be stopped while the driving motor continues to rotate the turntable hub.

The control knob normally used for ON-OFF-REJECT functions, is provided with a 4th position in which the record changer repeatedly plays a record on the turntable without shutting off the machine. This REPEAT PLAY position is reached by first moving the control knob to the ON or REJECT position and then moving it back OFF to a position between the ON and OFF positions. When so moved, a detent force is provided for the control knob and an audible click is produced to inform the operator that the REPEAT PLAY position has been reached.

The invention both as to its organization and method of operation, together with further objects and advantages thereof, will best be understood by reference to the following specification taken in connection with the accompanying drawings.

FIG. 2 is a bottom view of the record changer of FIG. 1;

FIG. 3 is a perspective view of the tone arm subassembly of the changer of FIG. 1 when the changer is turned off;

FIG. 4 is a view similar to FIG. 3 but showing the position of the tone arm near the end of a last record shutoff cycle;

FIG. 5 is a fragmentary sectional view taken along the lines 5—5 of FIG. 1;

FIG. 6 is a fragmentary external view similar to FIG. 5 but taken on a larger scale;

FIG. 10 is a perspective view of the velocity trip clutch employed in the changer of FIG. 1;

FIG. 11 is a sectional view taken along the line 11—11 of FIG. 10;

FIG. 12 is a sectional view taken along the line 12—12 in FIG. 1;

FIG. 13 is a fragmentary plan view illustrating in diagrammatic form the operation of the drive-velocity trip mechanism of the changer of FIG. 1 in initiating a record changing cycle and showing the main gear in the home or detent position;

FIGS. 14 to 19 are views similar to FIG. 13 but showing the main gear at different positions in the record changing cycle;

FIG. 20 is a view similar to FIG. 13 but showing the action of the velocity tripping mechanism of the changer of FIG. 1 during a playing cycle;

FIG. 21 is a fragmentary sectional view taken along the line 21—21 of FIG. 5 and showing the control knob of the changer of FIG. 1 in the OFF position;

FIG. 22 is a fragmentary sectional view similar to FIG. 25 but taken on a somewhat larger scale;

FIG. 23 is a perspective view of the flat spring blocking member employed in the changer of FIG. 1.

FIG. 24 is a view similar to FIG. 25 but showing the control knob in the ON position and the main cam in a last record shutoff cycle initiating position;

FIG. 25 is a fragmentary sectional view similar to FIG. 24 but taken on a somewhat larger scale;

FIGS. 26, 27 and 28 are views similar to FIG. 26 but showing the main cam in different positions during a last record shutoff cycle;

FIG. 28A is a fragmentary sectional view similar to FIG. 27 but taken on a somewhat larger scale;

FIG. 29 is a fragmentary sectional view taken along the line 29—29 of FIG. 26;

FIG. 30 is a sectional view similar to FIG. 25 but showing the control knob in the REJECT position to initiate a record changing cycle;

FIG. 30A is a fragmentary sectional view similar to FIG. 30 but taken on a somewhat larger scale.

FIG. 31 is a view similar to FIG. 24 but showing the mechanism in a single automatic record play position;

FIG. 32 is a view similar to FIG. 31 but showing the main gear at a later point in the single record automatic play changing cycle;

FIGS. 33 and 34 are fragmentary sectional views similar to FIG. 6 but showing the parts in different positions of a last record sensing cycle;

FIG. 33A is a view similar to FIG. 21 but showing the mechanism in a repeat play position;

Figure 1:
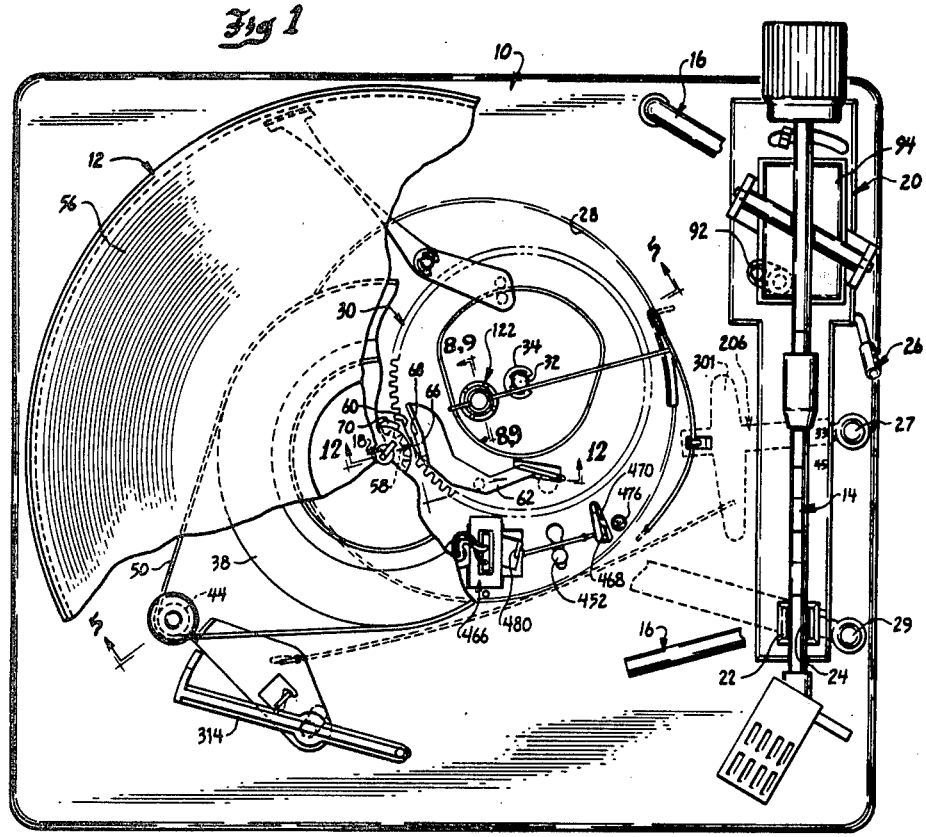
FIG. 1 is a top plan view of the record changer of the present invention with a portion of the turntable broken away to show a portion of the record changing mechanism.

Referring now to the drawings, the automatic record changer of the present invention is therein illustrated as comprising a metal base plate indicated generally at 10 on which is mounted a rotatable turntable indicated generally at 12, a tone arm indicated generally at 14, and a balance arm indicated generally at 16. The turntable 12 is mounted for rotation about a centering spindle indicated generally at 18 on which a stack of records may be supported and the balance arm 16 moved from its rest position somewhat beyond the position shown in FIG. 1 to a position over the records so that these records are balanced on the record supporting shelf of the spindle 18.

The tone arm 14 is rotatably mounted on a tone arm housing subassembly indicated generally at 20, the housing 20 being provided with a rest post portion 22 which extends upwardly from the housing 20 and is provided with a relatively deep notch 24 in the top thereof within which the tone arm 14 may be seated when the record changer is turned off. A cueing lever indicated generally at 26 is rotatably mounted in the tone arm subassembly 20 and may be moved from a generally vertical position to a rearward inclined position. When the cueing lever 26 is in the vertical position shown in FIG. 1, it is ineffecttive to lift the tone arm. However, when the cueing lever is moved to the rearward position it is effective to lift the tone arm off of the record after which it may be manually placed over another selection on the record or moved over the rest post 24. Then, the cueing lever may be used manually to lower the tone arm 14 into engagement with a record on the turntable 12, or the notch in the rest post, as will be readily understood by those skilled in the art.

A combined speed and size control knob 27 is provided which in the illustrated embodiment is movable between a 33⅓ rpm position and a 45 rpm position. In the 33⅓ rpm position the tone arm 14 is automatically adjusted to play 12-inch records and in the 45 rpm position the tone arm is automatically adjusted to play 7-inch records. When small-hole seven-inch records are to be played they may be placed on the shelf of the spindle 18 and the balance arm 16 employed to balance the record stack. When large-hole seven-inch records are employed a suitable adaptor may be placed on the spindle 18, as will be readily understood by those skilled in the art. In the event 10-inch 78 rpm records are to be played, the knobs 27 may be provided with a third detent position ahead of the 45 rpm position, as will be described in more detail hereinafter.

A multi-function control knob 29 is provided which has four positions, namely, an OFF position, a REPEAT PLAY position, an ON position and a REJECT position, from front to back of the changer. When the knob 29 is moved from the OFF position to the ON position the driving motor for the turntable 12 is energized and when the knob 29 is moved to the REJECT position a record changing cycle is automatically initiated. In accordance with an important aspect of the present invention, the record changer mechanism is so arranged that when the knob 29 is first moved to the ON position and then is moved back to the REPEAT PLAY position a slight detent force is exerted on the knob 29, which is not produced when the knob 29 is moved from OFF to ON, and an audible click is produced to inform the operator that he is in the REPEAT PLAY position. With the knob 29 in the REPEAT PLAY position the record changer repeatedly plays the record which is on the turntable 12. As noted above, the REPEAT PLAY position cannot be reached by simply moving the knob 29 from the OFF position to the adjacent REPEAT PLAY position. The knob 29 must first be moved to the REJECT position, so that the turntable motor is turned on, and then moved back to the REPEAT PLAY position. With this arrangement the single knob 29 is employed to provide functions requiring several knobs in conventional changers.

In accordance with a further important aspect of the present invention, the base plate 10 is provided with a central depressed portion 28. Most of the parts of the record changing mechanism per se are mounted on the top and bottom of the central depressed base plate portion 28, which is eccentric with respect to the spindle 18 to permit such mounting, thereby eliminating the conventional base plate subassemblies which are normally employed to mount the operative parts of the record changing mechanism. By employing the central base plate portion 28 as a support for the control levers and other parts of the record changing mechanism, the number of parts required is substantially reduced and in addition the amount of time required to assemble these parts in production is also substantially reduced. More particularly, a cycling gear indicated generally at 30 is rotatably mounted on a post 32 which is secured in the central base plate portion 28 and extends upwardly therefrom, the gear 30 being retained on the post 32 by any suitable means such as the C washer 34. A sleeve bearing 36 is mounted in the eccentric portion 28 of the base plate 10 and the spindle 18 is secured within the bearing 36. A turntable hub 38 is rotatably mounted on the sleeve bearing 36 and rests on a thrust bearing indicated generally at 40 which is positioned about the bottom end of the sleeve 36 and rests on the central base plate portion 28. The hub 38 is retained on the bearing 36 by means of the O-ring 37.

In order to drive the turntable hub 38 a turntable driving motor 40 (FIG. 5) is mounted on the underside of the base plate 10 beyond the portion 28 and the shaft 42 thereof extends upwardly through an opening 44 in the base plate 10. A drive turret having a 45 rpm step 46 and a 33 rpm step 48 is mounted on the shaft 42 above the base plate 10 and a flexible belt 50 is employed to interconnect one of the turret steps 46, 48 with the turntable hub 38, the belt 50 riding on the periphery of the hub 38.

In accordance with an important aspect of the present invention, the turntable 12 is not directly connected to the turntable hub 38, but instead rests on a thin and relatively wide washer 52 which is positioned between the upper surface of the turntable hub 38 and the bottom surface of the turntable 12 adjacent a central depressed portion 54 of the turntable 12. The washer 52 is made of low coefficient of friction material, such as Teflon or the like. With this arrangement, the turntable 12 may be stopped during the record changing cycle, by brake means to be described in more detail hereinafter, so that the turntable 12 is stationary when a record is dropped onto it. This construction also permits the turntable hub 38 to be continuously driven from the motor 40 during the record changing cycle, the washer 52 providing a sufficiently low coefficient of friction bearing to permit stopping of the turntable 12 without placing an excessive load on the motor 40, and without requiring disengagement of the driving means between turntable and turntable hub by some means such as elevating or lowering of either the turntable hub 38 or the turntable 12. A suitable turntable mat 56 may be positioned on the upper surface of the turntable 12 to provide a cushion for records deposited on the turntable 12. The turntable 12 is retained in the hub 38 by means of an O-ring 39 and the central opening in the turntable 12 rides on the upper shaft portion 41 of the hub 38 which acts as a bearing for the turntable during braking.

In order to drive the main cycling gear 30 during a record changing cycle, the turntable hub 38 is provided with pinion gear teeth 58 at the bottom end thereof which are adapted to engage the peripheral gear teeth of the gear 30. However, during the playing cycle the gear 30 is detented in a home position in which a mutilated portion 60 of the gear 30 is opposite the gear teeth 58 so that these teeth are not in mesh during the playing cycle.

In order to initiate a record changing cycle, a single velocity trip lever 62 (FIG. 1) is pivotally mounted on the upper face of the gear 30 by means of a pin portion 61 which is positioned within the central bore of a downwardly extending housing portion 63 (FIG. 5) of the main gear 30, the lever 62 being provided with an upstanding flange portion 66 (FIG. 1) in which a vertically extending shoulder 68 is formed. The shoulder 68 is arranged to be struck by a flange 70 provided on the central sleeve portion of the turntable hub 38 above the gear 58 when the shoulder portion 66 of the velocity trip lever 62 is moved inwardly by a predetermined amount. Movement of the velocity trip lever 62 is effected at the end of the playing cycle by means of a velocity tripping mechanism to be described in more detail hereinafter. As soon as the velocity trip lever 62 has been pivoted by an amount sufficient to bring the shoulder 68 into the path of the flange 70, the gear 30 is rotated by engagements of these members by an amount such that the gear teeth of the turntable hub gear 58 engage the adjacent teeth of the gear 30 and rotate the gear 30 through one revolution during the record changing cycle.

In accordance with an important aspect of the present invention, rotation of the main gear 30 is employed to effect the desired lifting and rotation of the tone arm 14 by means of two members which are interconnected with the tone arm subassembly 20 in such manner that they may be readily disconnected. With this arrangement, the tone arm subassembly 20 may be separately manufactured and tested prior to installation in the base plate 10, after which installation connection may be readily made to the automatic record changing mechanism through these interconnecting elements. Furthermore, these interconnecting elements are so constructed that warping or bending of the base plate 10 does not interfere with the proper operation of the changer during the record changing cycle or introduce errors in the set down adjustment of the tone arm 14 or the velocity tripping mechanism therefor.

TONE ARM LIFTING MECHANISM

Considering first the manner in which the tone arm 14 is lifted off of a record on the turntable 12 at the beginning of the record changing cycle, a tone arm lift rod indicated generally at 72 (FIG. 3) is provided with a right angle end portion 74 which is mounted in spaced apart bearings in the tone arm subassembly 20. More particularly, the tone arm subassembly 20 includes a main housing 76 which is provided with a pair of downwardly extending posts 70 and 80. A plate 82 is mounted on the posts 78 by means of screws. The housing 76 includes an upstanding portion 88 which is provided with a vertically extending bore 90 which is adapted to receive the upper end of the right angle portion 74 of the tone arm lift rod 72. The upper end of the bore 90 is arranged to form a bearing for the upper end of the right angle portion 74 and the plate 82 forms a lower bearing for this right angle end portion 74. As a result, the lift rod 72 is supported by these two spaced apart bearings so that it may be smoothly raised and lowered. The upper end of the right angle end portion 74 is threaded and an adjustable cap 92 is threaded onto the upper end of the right angle end portion 74, the cap 92 being arranged to engage the undersurface of a flat plate portion 94 of the tone arm 14.

The plate 82 is provided with a downwardly extending offset flange portion 96 which has an inclined camming surface 98 formed in the bottom edge thereof. The tone arm lift rod 72 is biased upwardly into engagement with the camming surface 98 by means of a coil spring 100 the bottom end of which is hooked around the tone arm lift rod 72. The spring 100 extends upwardly through an opening formed in the plate 82 and into the interior of an upwardly extending housing 104 formed in the plate 82. The upper end of the spring 100 is secured to the top wall of the housing 104. The other end of the lift rod 72 is provided with a right angle end portion 106 which is biased into engagement with a depending cam indicated generally at 108 (FIG. 7), which is formed in the bottom surface of the gear 30, this biasing force being achieved by virtue of the upward force exerted by the spring 100 adjacent the inclined camming surface 98 which tends to rotate the end portion 106 of the lift rod 72 toward the center of the gear 30.

When the gear 30 starts to rotate at the beginning of the record changing cycle the end portion 106, which is continuously biased into engagement with the cam 108 by virtue of the twisting action produced by the upward force of the spring 100 in relation to the inclined camming surface 98, follows the portion 110 of the cam 108 with the result that the lift rod 72 is pivoted about the above-described bearings for the end portion 74 thereof. However, since the spring 100 is continuously urging the lift rod 72 upwardly, as this rod is rotated it is also bodily lifted upwardly as it rides along the cam surface 98. Accordingly, the end portion 106 may be rotated by an amount sufficient to permit the lift rod 72 to be lifted up to the position shown in FIG. 4 wherein the portion 106 of the rod 72 engages the end of the slot 114 (FIG. 21) in the base plate 10. The flange 96 is also provided with stops 111, 112 at either end of the cam surface 98 to limit movement of the rod 72 during assembly. As this upward movement of the lift rod 72 occurs, the cap 92 on the upper end of the end portion 74 of the lift rod engages the plate 94 and lifts the tone arm upwardly off of the record which has just been played on the turntable 12. In this connection it should be noted that the tone arm 14 is shown in FIGS. 3 and 4 in a position over the rest post 22. However, a similar lifting action is provided by the lift rod 72 when the tone arm 14 is resting on a record seated on the turntable 12.

The end portion 106 of the lift rod 72 extends upwardly through a slot 114 (FIG. 7) formed in the base plate 10 so that the upper portion of the end portion 106 may be biased into engagement with the cam 108 as described heretofore. The spring 100 maintains the lift rod 72 in an elevated position after the end portion 106 have been moved out of engagement with the cam portion 110 so that the tone arm remains in an elevated position during the portion of the record changing cycle during which the next record is being deposited on the turntable and the tone arm is moved inwardly to the correct record size position, as will be described in more detail hereinafter. However, near the end of the record changing cycle the end portion 106 of the lift rod 72 engages the cam portion 116 of the cam 108. The cam portion 116 is not as steep as the cam portion 110 and hence the tone arm is gently lowered to the surface of the record on the turntable 12 as the end portion 106 is engaged by the cam portion 116 and moved outwardly and the lift rod 72 is cammed down the surface 98 against the force of the spring 100. Very close to the end of the record changing cycle the end portion 106 engages an intermediate portion 118 (FIG. 24) of the cam 108. The portion 118 is formed along an arc having the center of the gear 30 as its center so that the biasing force which is exerted by the end portion 106 on the cam 108 and hence the gear 30, is constant and minimized as the gear 30 approaches its home or detent position. In this connection it will be noted that the end portion 106 moves upwardly relative to the cam portion 110 as the lift rod is bodily moved upwardly at the beginning of the record changing cycle. Also the end portion 106 is moved downwardly relative to the cam portion 116 as the tone arm is lowered. However, no upward or downward movement of the end portion 106 relative to the cam portion 118 is experienced as the end portion 106 traverses the cam portion 118 so that minimal forces are exerted on the gear 30 as it approaches the detent position. In this connection it will be noted that raising and lowering of the tone arm 14 is achieved solely in response to rotation of the end 106 of the lift rod 72 as controlled by the cam 108 so that an extremely simple and yet efficient and smoothly acting tone arm lift arrangement is provided in accordance with the present invention. Furthermore, it is pointed out that the amount of lift is determined at the tone arm subassembly 20 by the cam surface 98 and warpage of the base plate does not change the height of the tone arm lift as it would with conventional linear motion slides which are directly connected to the main cycling gear. It is also pointed out that the lift rod 72 functions smoothly with relatively little force because the cam surface 98 is positioned quite a distance from end portion 74 about which the rod 72 pivots. This construction permits the cam surface 98 to have a gradual slope, whereas if this cam were placed close to the end 74 it would have to be relatively steep and substantial additional force would be required to move along it. However, the cam surface 98 can be spaced away from the end 74 only because spaced apart bearings are provided for the end 74, as described heretofore, so that the rod 72 may be lifted smoothly and with little force exerted thereon.

HORIZONTAL TONE ARM MOVEMENT

Considering now the manner in which the tone arm 14 is moved horizontally, in accordance with an important aspect of the present invention a drive trip link 120 is employed to interconnect the gear 30 with the tone arm 14 so that the tone arm is moved outwardly during the first portion of the record changing cycle and is then moved inwardly over the record which has been deposited on the turntable 12 and into engagement with the lead-in groove of this record. The drive trip link 120 also acts as a velocity trip actuating member during the playing cycle. The link 120, which may be simply a stiff wire, is connected to the gear 30 at a point offset from the center thereof by means of a clutch mechanism indicated generally at 122. The other end of the link 120 is connected to a tone arm quadrant member 124 (FIG. 2) which is connected to and moves with the tone arm 14 by means to be described in detail hereinafter. More particularly, the link 120 is provided with a right angle end portion 126 which extends through the central opening in a bushing 128 which is loosely positioned in a slot 130 formed in the quadrant 124. As best illustrated in FIG. 11 the bushing member 128 is provided with a head portion 132 which rides on the upper surface of the quadrant 124 beyond the edges of the slot 130. A light coil spring 134 is positioned between an enlarged end portion 136 at the bottom of the bushing 128 and the underside of the quadrant 124 so that a light clutch force is provided to prevent the member 128 from moving within the slot 130 unless this force is overcome. However, when the member 128 is moved into engagement with either end of the slot 130 a positive drive connection is provided between the link 120 and the quadrant 124.

Figure 8:
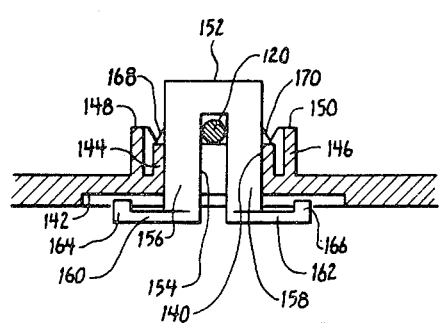
FIG. 8 is a sectional view taken along the lines 8—8 of FIG. 1 and showing the tone arm drive-trip clutch in its rest position.

Considering now in more detail the clutch 122, an opening 140 is formed in the main gear 30 which communicates with a recess 142 of larger diameter on the underside of the gear 30. A central annular wall 144 is formed in the gear 30 adjacent the opening 140 and an outer annular wall 146 is also formed in the gear 30, the outer wall 146 having a pair of opposed cam actuating shoulders 148 and 150 formed therein which project upwardly above the top of the central annular wall 144. A clutch drive pivot 152 is loosely mounted for rotation in the opening 140 in the gear 30 and is provided with a narrow slot 154 which extends upwardly from the bottom of the member of the pivot 152 and is adapted to receive the end portion of the drive-trip link 120. The legs 156 and 158 which are formed in the pivot 152 by virtue of the slot 154 are provided with offset flexible end portions 160 and 162 which terminate in feet 164 and 166 which are adapted to engage the recess 142 of the gear 30 when the pivot 152 is moved to an elevated position within the opening 140. The pivot 152 is also provided with opposed shoulders 168 and 170 which are adapted to rest on the upper surface of the central annular wall 144 when the pivot 152 is in the declutched or velocity tripping position shown in FIG. 8. In order to assemble the pivot 152 within the gear 30, the opening 140 is provided with opposed grooves 172 and 174 (FIG. 14) which permit the pivot 152 to be inserted upwardly through the opening 140 after which the pivot 152 is rotated and the end of the drive-trip link 120, which is inserted into the groove 154 and can then rest on the upper surface of the wall, as shown in FIG. 8.

Considering now the operation of the above-described clutch 122 and drive-trip link 120 in moving the tone arm 14 outwardly to the rest post 22 and then returning the tone arm to the desired set down position during the record changing cycle. During the initial portion of the record changing cycle, while the tone arm 14 is being lifted off of the record as described heretofore, the clutch 122 does not interconnect the gear 30 with the link 120 so that no outward movement of the tone arm is produced during the tone arm lifting operation. This is because the link 120 remains loosely positioned within the slot 154 of the drive pivot 152 as the gear 30 is moved from the position shown in FIG. 13 to the position shown in FIG. 14. During this movement of the gear 30 the drive pivot 152 is however rotating slightly relative to the gear 30 since the pivot 152 is maintained in alignment with the link 120 by virtue of the fact that the link 120 extends through the transverse slot 154 in the pivot 152.

Figure 9:
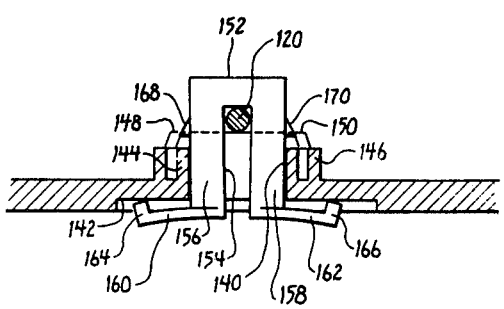
FIG. 9 is a sectional view similar to FIG. 8 but showing the tone arm clutch in its tone arm drive position.

When the gear 30 approaches the position shown in FIG. 14 the link 120 rides up the inclined portions 180, 182 formed in the outer wall 146 and onto the upper surface of the opposed shoulders 148, 150. As this occurs, the link 120 engages the top of the groove 154 and lifts the pivot 152 upwardly until the feet 164, 166 thereof are biased into engagement with the recess 142 in the gear, as shown in FIG. 9. The shoulders 148, 150 are made of sufficient height that the feet 164, 166 engage the gear 30 with sufficient force to clutch the drive-trip link to the gear 30 as the gear continues to rotate. However, this frictional force is not so great as to prevent the pivot 152 from rotating relative to the gear 30 since the pivot 152 must remain aligned with the link 120 which extends through the notch 154 therein, and the other end of the link 120 is pivotally connected to the quadrant 124 of the tone arm mechanism, as described in detail heretofore. During this rotary movement of the pivot 152 with respect to the gear 30 the feet 164, 166 slip along the surface of the recess 142 while maintaining the above-described frictional force for the link 120.

As soon as the link 120 is moved upwardly into engagement with the upper surface of the shoulders 148, 150 the link 120 becomes clutched to the gear 30 and as the gear continues to rotate the link 120 moves outwardly. If the velocity trip clutch bushing 128 is not positioned at the rear of the slot 130 in the quadrant 124, this initial outward movement of the link moves the member 124 to the outer end of slot 130 after which point the tone arm 14 is moved outwardly with the link 120 as the gear continues to rotate. The tone arm 14 is moved outwardly until it engages a blocking shoulder 184 on the rest post 22 the shoulder 184 extending upwardly a substantially greater distance than the inner shoulder 186 of the rest post 22. The relative position of the link 120 and the clutch 122 as the tone arm is moved into engagement with the rest post shoulder 184 is shown in FIG. 15.

Since the tone arm cannot move further outwardly when it engages the shoulder 184, as the gear 30 continues to rotate the clutch 122 permits such further rotation by slippage between the link 120 and the clutch 122. More particularly, while the frictional force with which the feet 164, 166 engage the gear 30 is sufficient to move the tone arm outwardly, as described heretofore, this force is not too great that it cannot be overcome when the tone arm strikes an obstruction such as the shoulder 184. When such an obstruction is encountered the link 120 slides over the upper surface of the shoulders 148, 150 and also slides relative to the pivot 152 by virtue of a sliding action of the link 120 in the bottom of the groove 154. Accordingly, as the gear 30 continues to rotate from the position shown in FIG. 15 to the position shown in FIG. 16 the clutch 122 continues to urge the tone arm against the shoulder 184 while the link 120 slides relative to the clutch 122 to the position shown in FIG. 16. However, as soon as the link 120 rides down the inclined portions 188, 190 formed in the outer wall 146 the feet 164, 166 of the pivot 152 are no longer biased into engagement with the gear 30 so that the link 120 becomes disengaged from the gear 30 while the tone arm 14 remains in its position in contact with the shoulder 184 of the rest post 22.

After the gear 30 has been rotated to the position shown in FIG. 17 the link 120 again rides up the inclined portions 180, 182 so that the gear 30 again becomes clutched to the link 120. As the gear 30 continues to rotate from the position shown in FIG. 17 to the position shown in FIG. 18 the link 120 is first moved so that the velocity trip clutch bushing 128 is moved to the forward end of the slot 130 and thereafter the link 120 functions to move the tone arm inwardly. By disconnecting the link 120 from the gear 30 during travel from the position shown in FIG. 17, the tone arm can remain in its position over the rest post for a longer period of time while the next record is being deposited on the turntable 12. This inward movement of the tone arm quadrant 124 continues until the twelve-inch record positioning shoulder 192, which is formed in the quadrant 124, strikes the upturned flange portion 194 of a size selector slide 196. The slide 196 is manually positioned at the twelve-inch position by means to be described in more detail hereinafter. When the shoulder 192 of the quadrant 124 strikes the size selector flange 194 further inward movement of the tone arm is prevented. However, since the gear 30 continues to rotate the clutch 122 again permits sliding movement of the link 120 relative to the shoulders 148, 150 and the pivot 152, as described heretofore in connection with FIGS. 15 and 16. It should be noted that as the gear rotates from the position shown in FIG. 18 to the position shown in FIG. 19, a constant pull is exerted on the link 120 so that the velocity trip clutch bushing 128 remains positioned at the forward end of the slot 130 in the quadrant 124. The velocity tripping mechanism is thus continuously urged to the proper reset position of the velocity trip clutch during movement of the gear from the position shown in FIG. 18 to the position shown in FIG. 19.

When the gear 30 reaches the position shown in FIG. 16 the link 120 rides down the shoulders 188, 190 so that the gear 30 thereafter becomes disconnected from the link 120 as the gear 30 is returned to the detent or home position shown in FIG. 1. In the detent position the link 120 is completely free to move since the pivot 152 is now supported by engagement of the shoulders 168, 170 thereof with the upper surface of the inner wall 144. Furthermore, the link 120 is positioned approximately midway between the shoulders 148, 150 and rests loosely within the slot 154 in the pivot 152, as shown in FIG. 8.

LAST RECORD SENSING AND SHUT-OFF

In the record changer of the present invention, the last record sensing mechanism is combined with the record ejecting mechanism provided at the spindle 18. With this arrangement the balance arm may be of simple construction and need not include any last record shut-off facilities as is conventional in many changers. Furthermore, by accomplishing the last record sensing in the area of the spindle 18 and gear 30, the record changer mechanism is substantially simplified and no interconnection with the tone arm mechanism other than the above-described members 72 and 120 is required. This arrangement has the further advantage of rendering the record changer less sensitive to warpage and bending of the main base plate 10 and hence misalignment of the tone arm area with respect to the center of the base plate.

In accordance with an important aspect of the present invention, the last record sensing operation is accomplished by movement of the record ejector blade in the same direction as this blade moves to eject a record from the shelf of the spindle 18. Such an arrangement substantially simplifies the last record sensing mechanism, as will be described in more detail hereinafter. Considering first the elements provided for ejecting a record from the shelf of the spindle 18, a push-off slide 370 (FIG. 5) is slidably mounted beneath the central portion 28 of the base plate 10. More particularly, the slide 370 is provided with a cam follower pin 372 which is secured to one end of the slide 370. The pin 372 is provided with a groove 374 which rides in the narrow portion of a keyhole slot 376 formed in the central portion 28 of the base plate 10. A flange 378 extends downwardly therefrom through an opening 380 in the push-off slide 370, the flange 378 engaging the sides of the opening 380 so that the slide is guided by means of the flange 378 and slot 376 for reciprocal movement with respect to the base plate portion 28. A push-off slide actuating cam indicated generally at 382 is formed on the underside of the main gear 30 and extends downwardly therefrom. The slide 370 is provided with a downturned flange portion 384 and a spring 386 is connected between the flange 378 and the flange 384 so as to bias the cam follower pin 372 into engagement with the outer surface of the cam 382. It will be noted that the spring 386 is connected to the flange 378 at a point closer to the base plate than the other end of the spring 386. Accordingly, the spring 386 also provides an upward bias on the slide 370.

Figure 7:
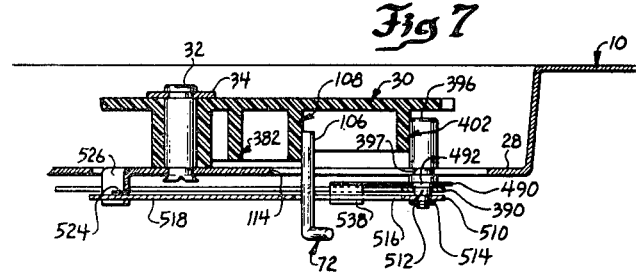
FIG. 7 is a fragmentary sectional view taken along the line 7—7 of FIG. 2.

In order to detent the main gear 30 in its home or detent position shown in FIG. 1 during periods between record changing cycles, a detent lever indicated generally at 390 (FIG. 21) is pivotally mounted on the base plate portion 28. More particularly, the lever 390 is provided with a pin 392 which extends into a keyhole slot 394 formed in base plate portion 28. A detent pin 396 is secured to an arm portion 398 of the lever 390 and extends upwardly through the opening 114 in the base plate portion 28. The detent pin 396 is biased into engagement with a main control cam indicated generally at 402 which is formed integrally with the main gear 30 and extends downwardly therefrom. The control cam 402 is provided with a notch portion 405 (FIG. 24) into which the detent pin 396 is biased by means of a spring 404 which is connected between a projection 406 formed in the arm 408 of the detent lever 390 and an opening 410 in the base plate portion 28. The spring 408 tends to rotate the lever 390 about the pivot pin 392 so that the detent pin 396 is held in the notch 405 when the gear 30 is in its home or detent position. The detent pin 396 is provided with a groove 397 (FIG. 7). One edge of the groove 397 moves along the arcuate edge portion 399 of the opening 114 in the base plate portion 28. With this arrangement the detent pin 396 is stabilized as the detent lever 390 is pivoted about the pin 392.

The push-off slide 370 is provided with a U-shaped end portion which defines a tab portion 412 (FIG. 5) which is positioned below the main portion of the push-off slide 370 and is immediately below an opening 414 in the slide 370 through which the lower end portion 416 of a record ejector blade indicated generally at 418 is positioned. The blade 418 is pivotally mounted in the body of the spindle 18 by means of a pin 420. The detent lever 390 is provided with an offset portion 422 (FIG. 21) at the end of the arm 408 which extends between the push-off slide 370 and its tab portion 412, as best illustrated in FIG. 5. The portion 422 of the detent lever 390 is provided with an arcuate narrow slot 424 (FIG. 21) which opens into a relatively wide slot 426, the intersection of the slots 424 and 426 defining an interference shoulder 428 in the vicinity of the end portion 416 of the ejector blade 418.

Since the spring 404 is connected to the base plate portion 28 it urges the portion 422 of the detent lever 390 upwardly into engagement with the push-off slide 370 and hence exerts an upward bias on the slide 370 in addition to the bias provided by the spring 386. With this arrangement the tab portion 412 of the push-off slide 370 exerts a slight upward force on the end of the record ejector blade portion 416. This force is employed during the last record sensing operation described in more detail hereinafter.

Considering first the operation of the push-off slide 70 in ejecting a record which is seated on the shelf 430 of the spindle 18, and assuming that a record changing cycle has been initiated in the manner described in detail heretofore, the push-off slide actuating cam 382 is provided with a first lobe portion 432 (FIG. 21) which functions to move the push-off slide 370 a slight amount during the initial or record sensing portion of the record changing cycle. During engagement of the pin 372 with the lobe 432 of the cam 382 the push-off slide 370 is moved from the position shown in FIG. 5 to the position shown in FIG. 33. During this movement the slight force which is exerted by the tab portion 412 on the end of the record ejector blade portion 416 is insufficient to move a record seated on the shelf 430 off of this shelf. As a result, the end portion 416 remains in the position shown in full lines in FIG. 33 as the slide 370 is moved to the right during engagement with the cam lobe portion 432. During this movement of the slide 370 the ejector blade end portion 416 is not moved since the opening 414 in the slide 370 provides clearance between the slide 370 and the end portion 416 during the record sensing portion of the record changing cycle. However, when the pin 372 engages the record ejecting lobe portion 434 on the cam 382, so that the push-off slide 370 is moved farther to the right as viewed in FIG. 5, the end portion 416 of the ejector blade 418 is engaged by the edge of the opening 414 in the slide 370 and is moved to the position shown in FIG. 34. During this push-off movement of the ejector blade 418, the upper portion 436 of the blade 418 engages the bottom record seated on the shelf 430 and moves this record off of the shelf so that the bottom record is deposited on the turntable 12. In this connection it will be understood that the position of the cam 382 on the gear 30 is so related to the position of the tone arm cam 108 that the tone arm 14 has been lifted upwardly and moved outwardly beyond the edge of the record stack before the end portion 436 of the record ejector blade has moved the bottom record off of the shelf 430. After the record has been ejected the spring 386 continues to bias the pin 372 into engagement with the cam 382 as the main gear 30 is rotated through the remainder of the record changing cycle. If desired, the ejector blade 418 may be provided with an elongated vertical slot for the pin 420 and is normally spring-biased so that the pin 420 is in the bottom of this slot. With such an arrangement the ejector blade may be depressed to the level of the shelf 430 by the record stack above the bottom record as the bottom record is ejected. The weight of the record stack is thus removed from the upper end of the blade 418 which facilitates return of the blade 418 to its rest position under the force of the return spring 386 through the slide 370.

Considering now the manner in which the absence of a record on the shelf 430 is sensed in accordance with the arrangement of the present invention, the control cam 402 on the main gear 30 is provided with a deep notch portion 440 (FIG. 21). During a normal record changing cycle, and assuming a record is seated on the shelf 430, when the gear 30 has been rotated an amount such that the detent pin 396 is opposite the notch 440 the spring 404 tends to rotate the detent lever 390 and move the detent pin 396 into the notch 440 but this action is prevented by engagement of the record ejector blade portion 416 with the interference shoulder 428 formed in the end portion 422 of the detent lever 390. In this connection it will be recalled that the light frictional force exerted on the end portion 416 by the tab 412 is insufficient to move the ejector blade 418 when a record is seated on the shelf 430. However, if no record is present on the shelf 430, during the initial record sensing portion of the cycle, i.e. during the period when the pin 372 engages the lobe 432 of the cam 382 and the slide 370 is moved from the position shown in FIG. 5 to the position shown in FIG. 33, the light force exerted on the end of the record ejector blade portion 416 is sufficient to move the ejector blade to the dotted line position 442 shown in FIG. 33. This movement of the bottom end of the ejector blade portion 416 causes a corresponding movement of the upper end 436 to the dotted line position 444 shown in FIG. 5. This last record sensing movement of the end portion 416 by engagement with the tab 412 takes place just prior to the point in the record changing cycle at which the detent pin 396 is opposite the notch 440. Accordingly, when the detent pin 396 encounters the notch 440 the ejector blade portion 416 is now moved into alignment with the notch 424 on the end portion 422 of the detent lever 390 so as to permit the spring 404 to rotate the detent lever 390 and move the detent pin 396 into the bottom of the notch 440. This inward movement of the detent pin 396 toward the center of the gear 30 is employed to turn off the motor 40 in accordance with a last record shut-off mechanism which will now be described.

Considering first the control linkage which is employed to turn on and off the motor manually, a control knob 29 is connected to the end of an on-off lever 450 (FIG. 21) which is rotatably mounted on a pin 452. The pin 452 is itself connected to a switch actuating plate 456 which is positioned below the lever 450. The pin 452 is provided with a groove 451 (FIG. 25B) which rides in the narrow portion of a keyhole slot 454 formed in the base plate portion 28. A flat spring blocking member 458 is positioned between the lever 450 and the plate 456 and is secured to the pin 452. More particularly, the pin 452 is provided with a first portion 453 of reduced diameter on which the on-off lever 450 is pivotally mounted. The pin 452 is also provided with a portion 455 of still smaller diameter which defines a shoulder 457 against which the blocking member 458 and switch actuating plate 456 are held by staking the end of the pin 452 so that the members 452, 456 and 458 move together. The plate 456 carries a pair of switch actuating arms 460 and 462 which are positioned on either side of the actuating button 464 of a slide switch indicated generally at 466. The on-off lever 450 is provided with an upwardly extending tongue portion 468 which extends into a triangularly shaped opening 470 in the base plate portion 28. The switch actuating plate 456 is provided with a projecting lug portion 472 to which one end of a spring 474 is connected, the other end of the spring 474 being connected to an opening 476 (FIG. 1) in the base plate portion 28. The on-off lever 450 is provided with a shoulder 478, FIG. 26 which is normally held in engagement with an upturned flange portion 480 on the switch actuating plate 456. In the OFF position of the control knob 29 the spring 474 functions to rotate the plate 456 so that the flange 480 thereof is in engagement with the shoulder 478 and the lever 450 is also rotated until the tongue 468 hits one end of the slot 470. In the OFF position of the plate 456 the arm 460 retains the switch button 464 of the switch 466 in the OFF position shown in FIG. 21.

The switch actuating plate 456 is provided with an upturned right angle flange portion 482 which extends upwardly through a notch 483 (FIG. 23) in the blocking member 458 and an irregularly-shaped opening 484 in the base plate portion 28. In the OFF position of the lever 450 one edge of the flange 482 rides on the curved edge portion or shoulder 486 of the opening 484 and is positioned substantially away from a right angle edge portion 488 of the opening 484, the surfaces 486 and 488 forming an essentially right-angled shoulder or corner. When the lever 450 is moved upwardly (as viewed in FIG. 21) toward the ON position the lever 450 and plate 456 move as a unit so that the flange 482 rides along the surface 486. However, as soon as the edge of the flange 482 is moved beyond the edge of the curved surface 486 the spring 474 moves the plate 456 with a snap action to the ON position shown in FIG. 24 as the pin 452 moves to the bottom of the elongated slot 454. At the same time, the arm 462 of the plate 456 engages the button 464 and moves the switch 466 to the ON position with a quick snap action movement. During this movement of the plate 456 the flange 482 drops down beside the surface 488 of the base plate opening 484. As soon as the flange 482 moves beyond the edge of the curved surface 486 the linkage 450, 456 actually pivots about the end of the on-off lever 450 which is being held by the operator. However, the flange 482 is biased into engagement with the surface 488 by the spring 474 and holds the lever 450 in the detented ON position.

When the control knob 29 is moved from the ON to the OFF position manually the on-off lever 450 rotates about the tongue 468 as a fulcrum and lifts the pivot pin 452 within the notch 454. However, until the flange 482 has been moved inwardly by an amount sufficient to clear the inner edge of the surface 488 the spring 474 is unable to rotate the plate 456 and actuate the switch 464. Accordingly, it is not until the plate 456 has been moved inwardly by an amount sufficient to cause the flange 482 thereof to engage the curved surface 486 that the spring 474 then rotates the plate 456 about the pin 452 with a snap action and the arm 460 at this time moves the button 464 so that the switch 466 is turned to the OFF position. It will be noted that the above-described on-off control linkage is effective to provide a snap action actuation of the switch 466 so that a relatively simple and inexpensive slide switch 466 may be employed to turn on and off the motor 40. A more expensive switch would be required if the on-off control linkage were such that the switch 466 could be held momentarily in a mid position which could cause damage to the switch contacts. However, with the above-described control linkage of the present invention it is impossible for the operator by movement of the control knob 29 to position the switch 466 in a position intermediate the ON or the OFF positions due to the above described snap action of the flange 482 with respect to the shoulder 486, 488.

Considering now the automatic shut-off mechanism of the present invention which cooperates with the above-described on-off control linkage to turn off the machine when the detent pin 396 enters the notch 440 in the control cam 402, it is first noted that this shut-off action is accomplished during the same record changing cycle during which the absence of a record on the shelf 430 is detected by movement of the end portion 416 during the sensing portion of the record changing cycle. As described generally heretofore, the tone arm 14 is moved outwardly during the record changing cycle until it strikes the back wall 184 of the tone arm rest post 22, during the mid portion of the record changing cycle. In accordance with an important feature of the present invention the tone arm is lowered during the period when it is in engagement with the back wall 184 of the rest post 22 so that the tone arm is lowered into the notch 24 during the mid portion of the last record shut-off cycle. Furthermore, the tone arm remains in this somewhat lowered position during the remainder of a last record shut-off cycle so that the tone arm is not moved back inwardly as the gear 30 rotates back to its detent position, the clutch 122 slipping during this motion of the gear 30, as described in detail heretofore. Such an arrangement has the advantage that a set-down or rest post position for the tone arm is not required on the quadrant 124 or elsewhere with the attendant difficulties of aligning such a rest post position with the tone arm mechanism.

In order to lower the tone arm to an intermediate position within the rest post notch 24 after the tone arm has engaged the back wall 184, a tone arm latch member indicated generally at 490 (FIG. 21) is pivotally mounted on the detent pin 396. More particularly, the detent pin 396, which is staked to the detent lever 390 is provided with a shoulder portion 492 (FIG. 7) on which the tone arm latch 490 is pivotally mounted, the latch 490 being preferably made of thin spring stock, or the like. The tone arm latch 490 is provided with an inwardly extending hook portion 494 (FIG. 21) and an extension arm portion 496 which is adapted to engage a downturned flange portion 498 of the base plate portion 28 when the detent pin 296 enters the notch 440. The tone arm latch 390 is also provided with an arm portion 500 which rides on the surface 502 of the detent lever 390 to stabilize the tone arm latch 490 during pivotal movement thereof.

As described generally heretofore, during the first portion of the record changing cycle the tone arm lift rod 72 is moved inwardly as the end 106 thereof follows the cam portion 110 on the gear 30. However, as the detent pin 396 enters the notch 440 the hook portion 494 of the tone arm latch 490 is moved inwardly to a point inside the end portion 106 of the lift rod 72 and as the arm 496 of the tone arm latch 490 engages the flange 498 the tone arm latch 490 is pivoted so that the hook portion 494 thereof is in alignment with the lift rod end portion 106 as shown in FIG. 26. Accordingly, as the detent pin 396 moves out of the notch 440 to the position shown in FIG. 26 the hook portion 494 engages the lift rod end portion 106 and moves it outwardly to the intermediate position shown in FIG. 26. At this point in the record changing cycle, the tone arm 14 has already been lifted from the record and moved outwardly into contact with the back wall 184 of the rest post 22. Accordingly, when the lift rod end portion 106 is moved outwardly by engagement with the hook portion 494 of the tone arm latch 490 the tone arm is immediately lowered into the notch 24 in the rest post 22. The detent pin 396 continues to ride on the periphery of the control cam 402 with the result that the latch 490 holds the lift rod 72 in the position shown in FIG. 27 until the end portion 106 of the rod 72 is engaged by the cam portion 116 near the end of the record changing cycle. When the end portion 106 engages the cam 116 the tone arm lift rod 72 is moved further down the inclined camming surface 98 and the end portion 74 thereof is lowered while the tone arm remains in the notch 24 of the rest post 22.

In order to actuate the on-off control linkage 450, 456 to turn off the motor 40 when the detent pin 396 enters the notch 440, a shut-off latch indicated generally at 510 (FIG. 21) is also pivotally mounted on the detent pin 396 and rotates on a shoulder formed by the reduced end portion 512 (FIG. 7) of the detent pin, the shut-off latch being retained on the end portion 512 by means of the C washer 514. The shut-off latch 510 is provided with a clearance opening 516 (FIG. 21) to accommodate movement of the lift rod end portion 106 and includes a first arm extension 518 which terminates in a hook portion 520, and an offset arm extension 522. Both of the arms 518 and 522 of the latch 510 are positioned in a slot 524 formed in a downturned flange portion 526 of the base plate portion 28. Also, the tip portion 528 of the switch actuating plate 456 also extends through the slot 524. The switch actuating plate 456 is also provided with a hook portion 530 immediately adjacent the inclined end portion 532 of the flat spring blocking member 458. The flat spring blocking member 458, which is positioned between the on-off lever 450 and the switch actuating plate 456 is provided with a notch to receive the right angle flange 482 of the switch actuating plate 456 so that the members 456 and 458 move together. However, the flat spring blocking member 458 is provided with an offset flange 534 which spaces the intermediate portion 536 of the flat spring member 458 below the plane of the members 456 and 518.

During a normal record changing cycle the shut-off latch 510 is never moved to a position in which the hook portion 520 thereof can become aligned with the hook portion 530 on the switch actuating plate 456. This is because the detent pin 396 never enters the notch 440 during a normal record changing cycle, as described in detail heretofore. However, when the detent pin 396 enters the notch 440 the shut-off latch 510 is moved so that the arm 518 thereof extends further through the slot 524. Also, when the detent pin 396 enters the notch 440 the tone arm latch 490 is pivoted by engagement of the arm 496 thereof with the flange 498, as described heretofore. When the tone arm latch 490 pivots, a downturned flange portion 538 (FIG. 21) thereof engages the edge 540 of the shut-off latch 510 and pivots it about the detent pin 396 to the position shown in FIG. 24.

In this position the hook portion 520 is positioned in alignment with the hook portion 530 on the switch actuating plate 456. Accordingly, as the detent pin 396 moves out of the notch 440, i.e. from the position shown in FIG. 26 to the position shown in FIG. 26 the hook portion 520 raises the inclined end portion 532 of the flat spring 458, moves into engagement with the hook portion 530 and after engagement of the members 520 and 530 lifts the on-off linkage 450, 456 slightly so that the pivot pin 452 is moved upwardly in the keyhole slot 454 to the position shown in FIG. 26. By positioning all of the members 522, 528 and 518 in the common slot 524 the engagement and hooking of the members 520 and 530 is insured without misalignment during a shut-off cycle.

The members 520 and 530 remain in the above-described hooked position as the detent pin 396 rides around the periphery of the control cam 402. However, near the end of the record changing cycle the detent pin 396 encounters an outwardly projecting inclined portion 542 (FIG. 26) of the control cam 402 which functions to move the switch actuating plate 456 toward the center of the gear 30 by an amount sufficient that the flange 482 thereof is moved inwardly beyond the end of the surface 488 in the base plate portion 28. When this occurs, the spring 474 exerts a sidewise pressure on the interconnected members 510 and 456 which is sufficient to move the edge of the flange 482 to the right to the position shown in FIG. 27, so that the edge of the flange 482 is now above the forward edge of the curved surface 486 while the shut-off latch 510 remains in latched engagement with the switch actuating plate 456. However, the arm 522 of the latch 510 engages the end of the slot 524 in the flange 526 and blocks the arm 528 of the plate 456 so that the plate 456 is prevented from rotating to the OFF position and the motor 40 continues to be energized. It is necessary to continue energization of the motor 40 because the disclosed belt drive of the turntable 12 has relatively little coast after the motor is de-energized and the gear 30 might not be returned to the notch 405. If an idler wheel drive arrangement is employed for the turntable 12 considerable coast is provided so that the motor could be turned off earlier in the cycle.

As the gear 30 continues to rotate the detent pin 396 moves down the inclined portion 544 (FIG. 26) of the control cam 402. During this movement the edge of the flange 482 on the switch actuating plate 456 strikes the curved surface 486 which blocks further movement of the hook portion 530 while the hook portion 520 of the shut-off latch 510 continues to move away from the hook 530. As soon as the latch portions 520, 530 become disengaged, the spring 474 rotates the switch actuating plate 456 while the edge of the flange 482 rides on the curved surface 486 as a pivot. During this rotation of the switch actuating plate 456 the arm 460 thereof engages the switch button 464 and moves the slide switch 466 in a snap action to the OFF position, as illustrated in FIG. 28. When the switch 466 is opened the motor 40 is de-energized and the gear 30 is moved into the detent notch 405 on the control cam 402 by the force exerted thereon from the spring 404 through the detent lever 390 and the detent pin 396. As discussed generally heretofore, there is an extremely light load on the gear 30 at this point in the record changing cycle so as to insure that the detent pin 396 enters the home or detent notch 405 in the cam 402. As the switch actuating plate 456 is thus moved to the OFF position the flange portion 480 thereof engages the shoulder 482 on the on-off lever 450 and moves this lever to the OFF position in unison, as shown in FIG. 28.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an automatic record player, the combination of, a turntable, a tone arm, means for mounting said tone arm for rotation about a fixed point beyond said turntable, a main cycling gear, cam means carried by said gear, means for rotating said gear one revolution during an automatic cycle, a rest post for said tone arm, tone arm retaining means positioned to be engaged by said tone arm, means controlled by movement of said gear during the first half of an automatic cycle for moving said tone arm outwardly into engagement with said rest post, means controlled by movement of said gear during the last half of an automatic cycle for moving said tone arm inwardly to a point over the lead-in groove of a record positioned on said turntable, means responsive to movement of said cam means during an automatic cycle for raising and lowering said tone arm, and means operable independently of said cam means during an automatic shutoff cycle for lowering said tone arm into engagement with said tone arm retaining means while said tone arm is in engagement with said rest post, said tone arm retaining means being effective to restrain said tone arm from inward movement during the remaining portion of said automatic shutoff cycle.

2. An automatic record changer as claimed in claim 1, wherein said tone arm raising and lowering means includes a tone arm lift rod having a horizontal portion one end of which is engageable by said cam means and the other end of which is connected to a right-angle end portion, bearing means for mounting said right-angle end portion for rotation about a vertical axis, means defining a shoulder positioned above and extending generally transversely of said horizontal portion, means for biasing said lift rod upwardly into engagement with said shoulder, said shoulder being inclined with respect to the horizontal so that said biasing means urges said one end of said horizontal portion into engagement with said cam means, and means operable independently of said cam means for moving said one end of said horizontal portion in the direction to lower said tone arm into engagement with said tone arm retaining means while said tone arm is in engagement with said rest post.

3. An automatic record changer as claimed in claim 1, wherein said tone arm retaining means comprises an opening in said rest post into which the outer end of said tone arm is lowered during the mid portion of said last record shutoff cycle.

4. In an automatic record player, the combination of, a turntable, a tone arm, means for mounting said tone arm for rotation about a fixed point beyond said turntable, a main cycling gear, means for rotating said gear one revolution during an automatic cycle, a member positioned beyond the edge of said turntable, tone arm retaining means positioned to be engaged by said tone arm, and automatic shutoff means controlled by movement of said gear during the first half of an automatic shutoff cycle for raising said tone arm and moving said tone arm outwardly into engagement with said member, said automatic shutoff means being operative during approximately the first half of said automatic shutoff cycle to lower said tone arm into engagement with said tone arm retaining means after said tone arm has been moved into engagement with said member, said tone arm retaining means being effective to restrain said tone arm from inward movement during the last half of said automatic shutoff cycle.

5. In an automatic record player, the combination of, a turntable, a tone arm, means for mounting said tone arm for rotation about a fixed point beyond said turntable, a main cycling gear, means for rotating said gear one revolution during an automatic cycle, tone arm retaining means positioned to be engaged by said tone arm, and automatic shutoff means responsive to movement of said main cycling gear for first moving said tone arm outwardly beyond the edge of a record positioned on said turntable and then lowering said tone arm into engagement with said tone arm retaining means during approximately the first half of an automatic shutoff cycle, said tone arm retaining means acting to restrain said tone arm against inward movement during the remainder of said automatic shutoff cycle while permitting vertical movement of said tone arm so that said tone arm may be lifted off of said tone arm retaining means after said automatic shutoff cycle has been completed.

6. In an automatic record player, the combination of, a turntable, a tone arm, means for mounting said tone arm for rotation about a fixed point beyond said turntable, a main cycling gear, means for rotating said gear one revolution during an automatic cycle, tone arm retaining means positioned to be engaged by said tone arm, and automatic shutoff means responsive to movement of said main cycling gear for first moving said tone arm outwardly beyond the edge of a record positioned on said turntable and then lowering said tone arm into engagement with said tone arm retaining means during approximately the first half of an automatic shutoff cycle, said tone arm retaining means acting to restrain said tone arm against inward movement during the remainder of said automatic shutoff cycle.

7. In an automatic record player the combination of, a turntable, a tone arm, means for mounting said tone arm for rotation about a fixed point beyond said turntable, a main cycling gear, means for rotating said gear one revolution during an automatic cycle, tone arm support means for supporting said tone arm beyond said turntable during periods when said automatic record player is inactive, means operative during a first automatic cycle for energizing said gear rotating means and moving said tone arm upwardly off of said tone arm supporting means, moving said tone arm inwardly to position said tone arm at a point over the lead-in groove of a record on said turntable and moving said tone arm downwardly into engagement with said lead-in groove, and automatic shutoff means responsive to movement of said gear during an automatic shutoff cycle for first moving said tone arm outwardly beyond the edge of a record positioned on said turntable and then downwardly into engagement with said tone arm supporting means during approximately the first half of said automatic shutoff cycle, said tone arm supporting means acting independently of said tone arm positioning means to restrain said tone arm against inward movement during the remainder of said automatic shutoff cycle, and means for de-energizing said gear rotating means near the end of said automatic shutoff cycle.

8. In an automatic record player, the combination of, a turntable, a tone arm, means for mounting said tone arm for rotation about a fixed point beyond said turntable, a main cycling gear, means for rotating said gear one revolution during an automatic cycle, tone arm retaining means positioned to be engaged by said tone arm, first and second cam means carried by said gear, means responsive to movement of said first cam means during a first automatic cycle for lowering said tone arm into engagement with a record on said turntable, and means responsive to movement of said second cam means for lowering said tone arm into engagement with said tone arm retaining means during the first half of an automatic shutoff cycle, said tone arm retaining means being effective to restrain said tone arm from inward movement during the last half of said automatic shutoff cycle.

9. In an automatic record changer, the combination of, a turntable, a tone arm, means for mounting said tone arm for rotation about a fixed point beyond said turntable, a main cycling gear, means for rotating said gear one revolution during an automatic cycle, tone arm retaining means positioned to be engaged by said tone arm, a tone arm lift rod having a horizontal portion and a right angle end portion, bearing means for mounting said right angle end portion for rotation about a vertical axis, means responsive to rotation to said lift rod about said axis for raising and lowering said tone arm, first means responsive to movement of said gear during a first automatic cycle for rotating said lift rod about said vertical axis so that said tone arm is raised during the initial portion of said first automatic cycle and is lowered into engagement with a record on said turntable during the final portion of said first automatic cycle, and second means responsive to movement of said gear during an automatic shutoff cycle for rotating said lift rod about said vertical axis so that said tone arm is lowered into engagement with said tone arm retaining means during the first half of said automatic shutoff cycle, said tone arm restraining means being operative to restrain said tone arm from inward movement during the remaining portion of said automatic shutoff cycle.

10. The automatic record player of claim 9, wherein said first means responsive to movement of said gear includes first cam means carried by said gear, and said second means responsive to movement of said gear comprises second cam means also carried by said gear but separate from said first cam means.

11. In an automatic record changer, the combination of, a turntable, a tone arm, means for mounting said tone arm for rotation about a fixed point beyond said turntable, a main cycling gear, means for rotating said gear one revolution during an automatic cycle, tone arm retaining means positioned to be engaged by said tone arm, a tone arm lift rod having a horizontal portion and a right angle end portion, bearing means for mounting said right angle end portion for rotation about a vertical axis, means responsive to rotation of said lift rod about said axis for raising and lowering said tone arm, means including first cam means carried by said gear for rotating said lift rod about said vertical axis in the direction to raise said tone arm during the initial portion of both a first automatic cycle and an automatic shutoff cycle, means including second cam means carried by said gear for rotating said lift rod in the direction to lower said tone arm into engagement with a record on said turntable during said first automatic cycle, and means including third cam means carried by said gear for rotating said lift rod about said vertical axis in the direction to lower said tone arm into engagement with said tone arm retaining means during the first half of said automatic shutoff cycle, said tone arm retaining means being operative to restrain said tone arm from inward movement during the remaining portion of said automatic shutoff cycle.

* * * * *